US011310866B2

(12) United States Patent
Adachi et al.

(10) Patent No.: US 11,310,866 B2
(45) Date of Patent: Apr. 19, 2022

(54) COMMUNICATION METHOD

(71) Applicant: KYOCERA Corporation, Kyoto (JP)

(72) Inventors: Hiroyuki Adachi, Kawasaki (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 22 days.

(21) Appl. No.: 16/345,745

(22) PCT Filed: Nov. 1, 2017

(86) PCT No.: PCT/JP2017/039613
§ 371 (c)(1),
(2) Date: Apr. 29, 2019

(87) PCT Pub. No.: WO2018/084199
PCT Pub. Date: May 11, 2018

(65) Prior Publication Data
US 2019/0261450 A1 Aug. 22, 2019

Related U.S. Application Data

(60) Provisional application No. 62/417,544, filed on Nov. 4, 2016.

(51) Int. Cl.
*H04W 80/02* (2009.01)
*H04W 76/11* (2018.01)
(Continued)

(52) U.S. Cl.
CPC .............. *H04W 80/02* (2013.01); *H04W 8/22* (2013.01); *H04W 76/11* (2018.02); *H04W 76/14* (2018.02);
(Continued)

(58) Field of Classification Search
CPC ..... H04W 80/02; H04W 76/14; H04W 76/11; H04W 8/22; H04W 80/08; H04W 88/04; H04W 92/18
See application file for complete search history.

(56) References Cited

U.S. PATENT DOCUMENTS 10,433,286 B2 * 10/2019 Nair .................. H04W 72/0406
2015/0029866 A1 * 1/2015 Liao .................. H04W 52/0216
370/241

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 13); 3GPP TS 36.300 V13.5.0; Sep. 2016, pp. 1-313, Valbonne, France.

(Continued)

*Primary Examiner* — Michael J Moore, Jr.
(74) *Attorney, Agent, or Firm* — Studebaker & Brackett PC

(57) ABSTRACT

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The first radio terminal transmits information indicating that the first radio terminal is capable of executing the layer 2 relay. The second radio terminal transmits a request for the layer 2 relay to the first radio terminal in response to receiving the information.

4 Claims, 20 Drawing Sheets

(51) Int. Cl.
  *H04W 80/08*    (2009.01)
  *H04W 88/04*    (2009.01)
  *H04W 92/18*    (2009.01)
  *H04W 8/22*     (2009.01)
  *H04W 76/14*    (2018.01)

(52) U.S. Cl.
  CPC ........... *H04W 80/08* (2013.01); *H04W 88/04* (2013.01); *H04W 92/18* (2013.01)

(56) References Cited

U.S. PATENT DOCUMENTS

| | | | |
|---|---|---|---|
| 2016/0142897 A1* | 5/2016 | Sorrentino | H04W 8/005 370/329 |
| 2017/0295178 A1* | 10/2017 | Cheng | H04W 12/06 |
| 2017/0347338 A1* | 11/2017 | Chen | H04W 8/005 |
| 2017/0353819 A1* | 12/2017 | Yin | H04L 47/30 |
| 2018/0054237 A1* | 2/2018 | Tseng | H04W 36/0033 |
| 2018/0069664 A1* | 3/2018 | Khoryaev | H04L 1/1812 |
| 2018/0279202 A1* | 9/2018 | Tenny | H04W 76/32 |
| 2019/0028177 A1* | 1/2019 | Feng | H04W 72/04 |
| 2019/0166486 A1* | 5/2019 | Tang | H04W 88/04 |
| 2020/0120728 A1* | 4/2020 | Wallentin | H04W 80/02 |
| 2021/0084555 A1* | 3/2021 | Feng | H04W 36/165 |

OTHER PUBLICATIONS

Nokia, Alcatel-Lucent Shanghai Bell, "Discussion on adaptation layer for FeD2D", 3GPP TSG-RAN WG2 Meeting #96, R2-168399, Nov. 14-18, 2016, 4 pages, Reno, USA.

\* cited by examiner

ADAPTATION/E/LCID/L SUB-HEADER WITH 7-BITS L FIELD

COMMUNICATION METHOD

TECHNICAL FIELD

The present disclosure relates to a communication method.

BACKGROUND ART

In 3GPP (3rd Generation Partnership Project), which is a project aiming to standardize a mobile communication system, the specifications of proximity-based services (ProSes) have been designed (see Non Patent Document 1).

In the Proses, a specific radio terminal (ProSe UE-to-Network Relay) can relay traffic between another radio terminal (Remote UE) and a network.

PRIOR ART DOCUMENT

Non-Patent Document

Non Patent Document 1: 3GPP technical specification "TS 36.300 V13.5.0" Sep. 29, 2016

SUMMARY OF THE INVENTION

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The first radio terminal transmits information indicating that the first radio terminal is capable of executing the layer 2 relay. The second radio terminal transmits a request for the layer 2 relay to the first radio terminal in response to receiving the information.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station notifies the first radio terminal and the second radio terminal of a plurality of logical channel identifiers associated with priorities. The plurality of logical channel identifiers are used for transmitting the packet between the first radio terminal and the second radio terminal. The second radio terminal selects a logical channel identifier corresponding to a priority of the packet from among the plurality of logical channel identifiers to transmit the packet to the first radio terminal.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station notifies the first radio terminal and the second radio terminal of a plurality of pieces of identification information associated with priorities. The second radio terminal selects identification information corresponding to a priority of the packet from among the plurality of pieces of identification information. The second radio terminal generates the packet to which a header including the selected identification information is added to transmit the packet to the first radio terminal.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station determines a logical channel identifier dedicated to a packet of the second radio terminal. The logical channel identifier is used for transmitting the packet between the first radio terminal and the base station.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station notifies the first radio terminal of a Radio Network Temporary Identifier (RNTI) assigned to the second radio terminal. The first radio terminal determines, as a packet of the second radio terminal, a packet successfully decoded using the RNTI out of packets received from the base station.

DESCRIPTION OF THE EMBODIMENT

Overview of Embodiment

Figure 1:
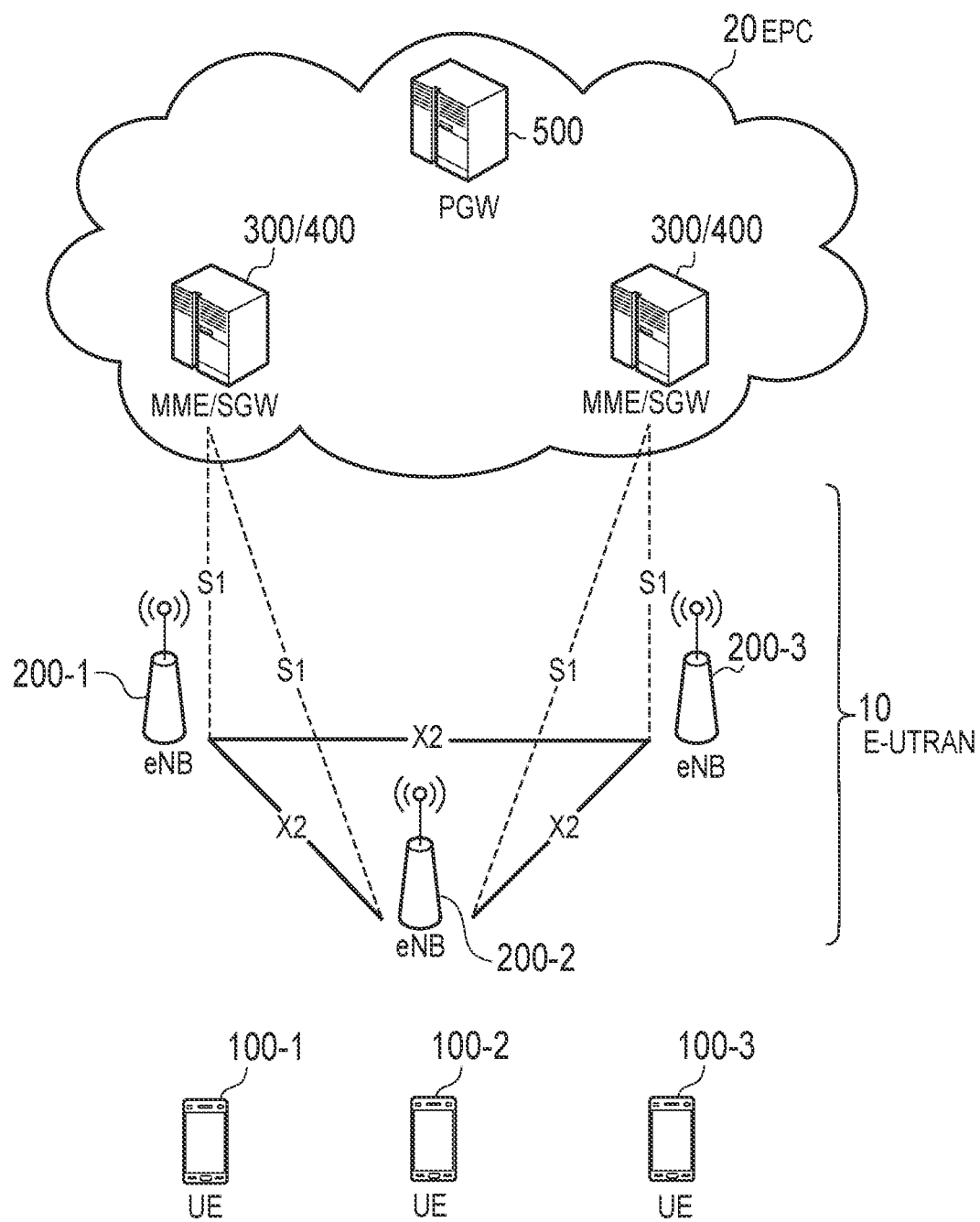
FIG. 1 is a diagram illustrating a configuration of an LTE system.

In recent years, layer 2 relay has been discussed. In the layer 2 relay, in a layer higher than the Radio Link Control (RLC) layer in Layer 2, packets of a radio terminal (Remote UE) are transmitted (relayed) between the radio terminal (Remote UE) and a base station (network) via a specific radio terminal (ProSe UE-to-Network relay).

However, since there is no mechanism for appropriately controlling the layer 2 relay, the layer 2 relay may not be performed properly.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The first radio terminal transmits information indicating that the first radio terminal is capable of executing the layer 2 relay. The second radio terminal transmits a request for the layer 2 relay to the first radio terminal in response to receiving the information.

In the layer 2 relay, processing of the packet may be executed in a special layer that is a higher layer than the RLC layer and different from a Packet Data Convergence Protocol (PDCP) layer. The base station and the second radio terminal may include, into the packet, information indicating that the packet has been processed in the special layer, in a layer lower than the special layer.

In the layer 2 relay, processing of the packet may be executed in a special layer that is a higher layer than the RLC layer and different from a Packet Data Convergence Protocol (PDCP) layer. The base station may notify the first radio terminal of a logical channel identifier for which a packet is permitted to be transmitted via the special layer.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station notifies the first radio terminal and the second radio terminal of a plurality of logical channel identifiers associated with priorities. The plurality of logical channel identifiers are used for transmitting the packet between the first radio terminal and the second radio terminal. The second radio terminal selects a logical channel identifier corresponding to a priority of the packet from among the plurality of logical channel identifiers to transmit the packet to the first radio terminal.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station notifies the first radio terminal and the second radio terminal of a plurality of pieces of identification information associated with priorities. The second radio terminal selects identification information corresponding to a priority of the packet from among the plurality of pieces of identification information. The second radio terminal generates the packet to which a header including the selected identification information is added to transmit the packet to the first radio terminal.

The selected identification information may be an identifier of a bearer established between the first radio terminal and a network.

The selected identification information may be a logical channel identifier used for transmitting the packet between the first radio terminal and the base station.

The header may further include an identifier of the second radio terminal.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station determines a logical channel identifier dedicated to a packet of the second radio terminal. The logical channel identifier is used for transmitting the packet between the first radio terminal and the base station.

A communication method according to one embodiment is a communication method in which a first radio terminal executes a layer 2 relay in which a packet of a second radio terminal is transmitted between the second radio terminal and a base station in a layer higher than a Radio Link Control (RLC) layer in Layer 2. The base station notifies the first radio terminal of a Radio Network Temporary Identifier (RNTI) assigned to the second radio terminal. The first radio terminal determines, as a packet of the second radio terminal, a packet successfully decoded using the RNTI out of packets received from the base station.

The second base station may determine, as the packet of the second radio terminal, a packet successfully decoded using the RNTI out of packets received from the first radio terminal.

Embodiments (Mobile Communication System)

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication apparatus (radio terminal). The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" may be used as a term indicating the minimum unit of a radio communication area. The "cell" may be used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300, an SGW (Serving Gateway) 400 and a PGW (Packet data Network Gateway) 500.

The MME 300 performs, for example, various kinds of mobility control for the UE 100. The SGW 400 performs, for example, data transfer control. The MME 300 and the SGW 400 are connected to the eNB 200 via a 51 interface. The PGW 500 performs control to relay user data from an external network (and to the external network).

Figure 2:
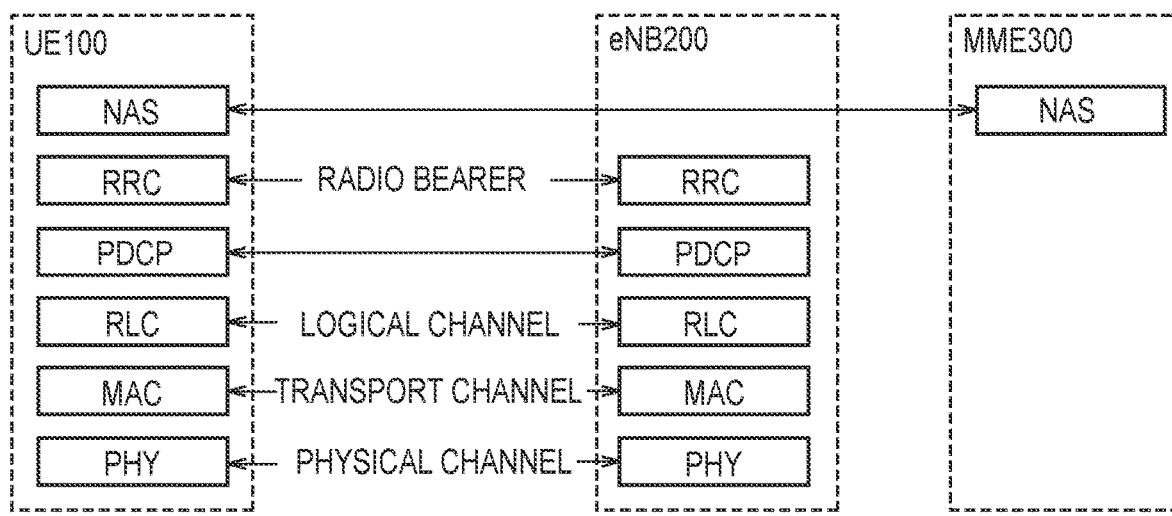
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
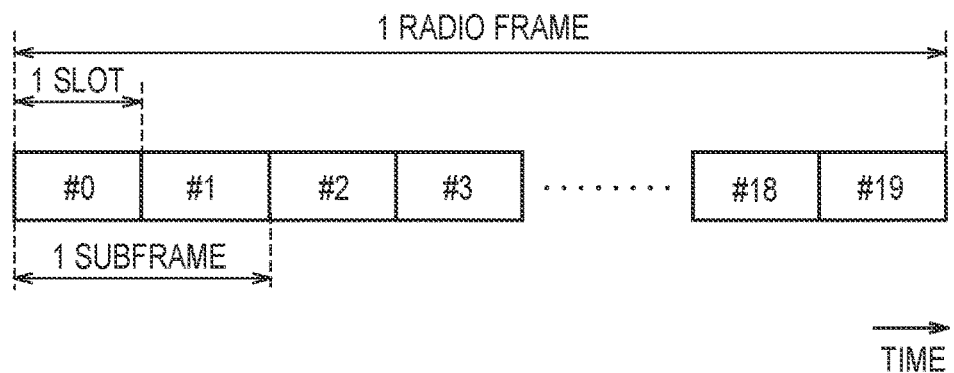
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Proximity-Based Service)

Proximity-based services (ProSes) will be described. The proximity-based service is a service that can be provided by a 3GPP system, based on communication devices (for example, UEs 100) in the vicinity of each other.

In the ProSe, various types of radio signals are transmitted and received via a direct radio link between nodes (for example, between UEs), without passing through the eNB 200. The direct radio link in ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface (PC5 connection). The PC5 is a reference point between ProSe usable UEs (ProSe-enabled UE) used for a control plane and a user plane for the ProSe direct discovery, the ProSe direct communication, and a ProSe UE-to-Network relay.

For modes of the ProSe, "direct discovery (Direct Discovery)", "direct communication (Direct Communication)", and "Relay" are defined. "Relay" will be described later.

The direct discovery is a mode of searching for a partner destination by directly transmitting, between the UEs, a discovery message (discovery signal) that does not specify a specific destination. The direct discovery is a procedure for discovering another UE in the vicinity of the UE by using a direct radio signal in E-UTRA (Evolved Universal Terrestrial Radio Access) via the PC5. Alternatively, the direct discovery is a procedure adopted by a UE 100 capable of executing the proximity-based service for discovering another UE 100 capable of executing the proximity-based service by using only a capability of the two UEs 100 with the help of the E-UTRA technology. The direct discovery is supported only if the service is provided to the UE 100 by the E-UTRAN (eNB 200 (cell)). The service can be provided by the E-UTRAN if the UE 100 is connected to the cell (eNB 200) or exists in the cell.

A resource allocation type for the transmission (announcement) of the discovery message (discovery signal) includes "Type 1" and "Type 2 (Type 2B)". In "Type 1", the UE 100 selects a radio resource. In "Type 2 (Type 2B)", the eNB 200 allocates a radio resource. In Type 1, the UE 100 may select a radio resource from resource pools provided by the eNB 200.

A "Sidelink Direct Discovery" protocol stack includes a physical (PHY) layer, a MAC layer, and the ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between the UEs by specifying a specific destination (destination group). The direct communication is communication between two or more UEs capable of executing the proximity-based services through user plane transmission in which the E-UTRA technology is used via a path without passing through any network node.

A resource allocation type of the direct communication includes "Mode 1" and "Mode 2". In "Mode 1", the eNB 200 assigns a radio resource of the direct communication. In "Mode 2", the UE 100 selects a radio resource of the direct communication. In Mode 2, the UE 100 may select a radio resource from the resource pools provided by the eNB 200.

A direct communication protocol stack includes a physical (PHY) layer, a MAC layer, an RLC layer, and a PDCP layer. Between the physical layer of the UE (A) and the physical layer of the UE (B), a control signal is transmitted via a physical sidelink control channel (PSCCH), and data is transmitted via a physical sidelink shared channel (PSSCH). A synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

(Layer 2 Relay)

Figure 4:
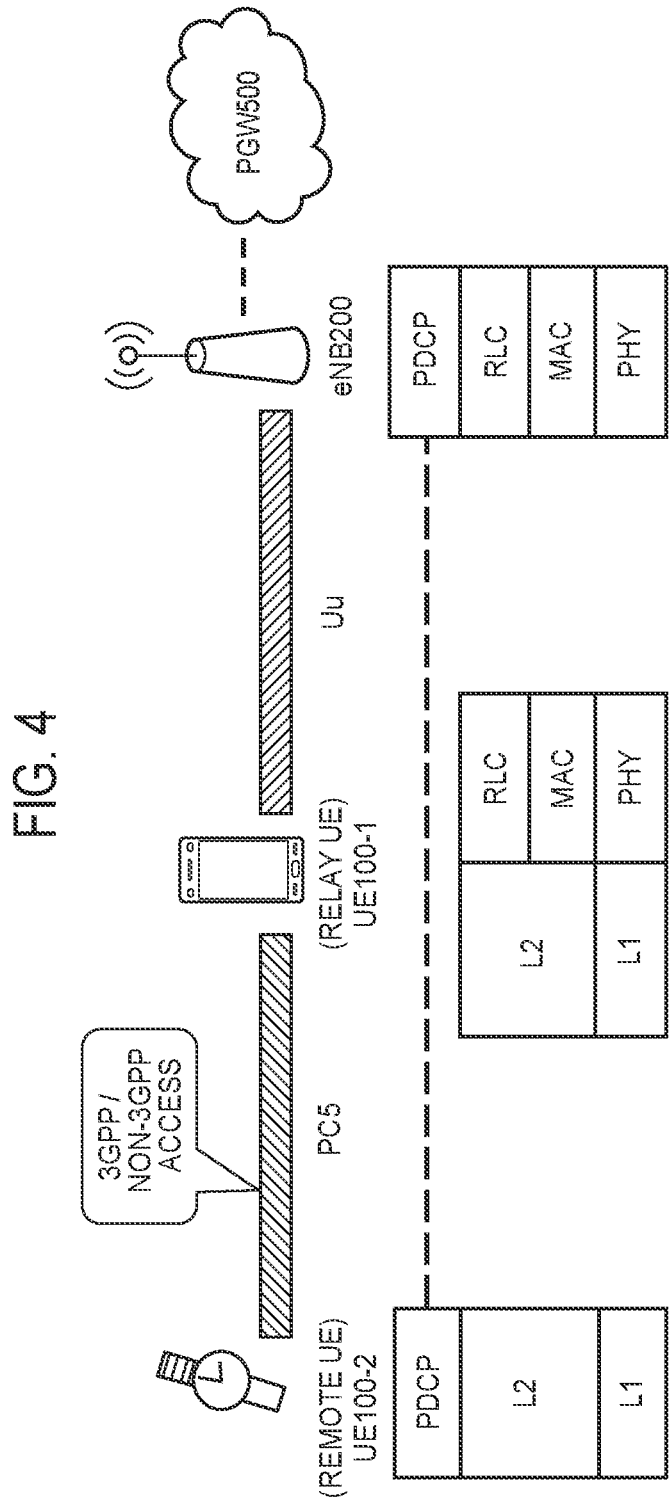
FIG. 4 is a diagram for describing an example of layer 2 relay.
Figure 5:
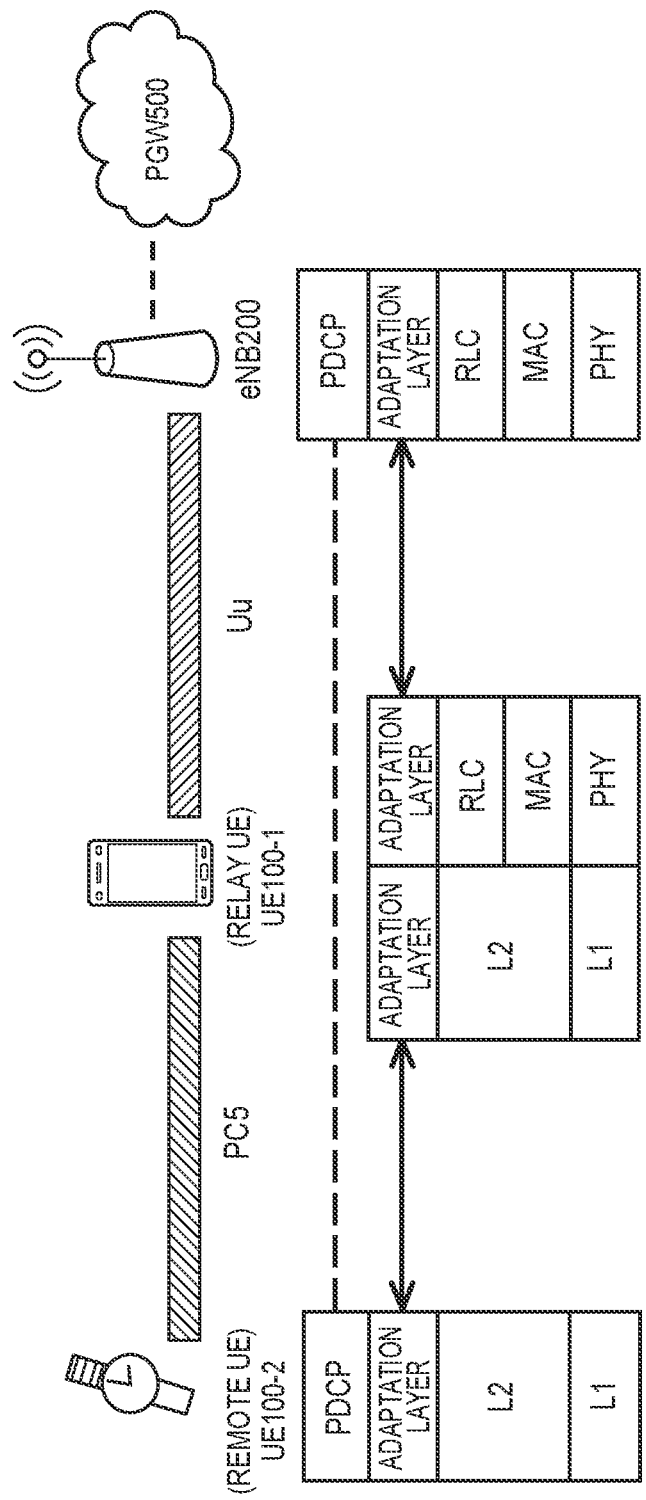
FIG. 5 is a diagram for describing an example of layer 2 relay.

The outline of the layer 2 relay will be described with reference to FIG. 4 and FIG. 5. FIG. 4 is a diagram for describing an example of the layer 2 relay. FIG. 5 is a diagram for describing an example of the layer 2 relay.

As illustrated in FIG. 4, in the layer 2 relay, a UE 100-1 is a relay terminal (relay UE). The UE 100-1 transmits (relays/transfers) packets of a UE 100-2 between the UE 100-2 and the eNB 200 (network). In the layer 2 relay, a packet of the UE 100 (UE 100-2) is transmitted (relayed) in a layer higher than the RLC layer in Layer 2. In the layer 2 relay, the packet of the UE 100 (UE 100-2) may be transmitted without processing the packet in the PDCP layer in Layer 2.

The UE 100-1 may be a ProSe UE-to-Network Relay. The ProSe UE-to-Network Relay may be a UE that provides a function of supporting connectivity to the network for a Remote UE.

The UE 100-2 may be a Remote UE. The Remote UE may be a UE that communicates with a PDN (Packet Data Network) via the ProSe UE-to-Network Relay. The Remote UE may be a ProSe-enabled Public Safety UE. The ProSe-enabled Public Safety UE may be a UE configured to be allowed for public safety use by HPLMN (Home Public Land Mobile Network). The ProSe-enabled Public Safety UE may be ProSe-enabled. The ProSe-enabled Public Safety UE may support the ProSe procedure and the ability specific to public safety. The ProSe-enabled Public Safety UE may have a USIM (Universal Subscriber Identification Module) together with one special access class.

A connection may be established between the UE 100-1 and the UE 100-2 by 3GPP (Third Generation Partnership Project) access technology. For example, user data (packet) and/or control information is transmitted between the UE 100-1 and the UE 100-2 via the PC5 interface (PC5 connection).

A connection may be established between the UE 100-1 and the UE 100-2 by non-3GPP access technology. For example, user data (packet) and/or control information is transmitted between the UE 100-1 and the UE 100-2 via a WLA (Wireless Local Area Network).

A connection may be established between the UE 100-1 and the eNB 200 by 3GPP (Third Generation Partnership Project) access technology. For example, user data (packet) and/or control information is transmitted between the UE 100-1 and the eNB 200 via the Uu interface (or the Un interface).

In the layer 2 relay, the UE 100-1 may establish a physical layer, a MAC layer, and an RLC layer. The UE 100-2 may establish a physical layer, a MAC layer, an RLC layer, and a PDCP layer. The eNB 200 may establish a physical layer, a MAC layer, an RLC layer, and a PDCP layer. A packet of the UE 100-2 is transmitted between the PDCP layer of the UE 100-2 and the PDCP layer of the eNB 200 via the UE 100-1.

As illustrated in FIG. 5, when the layer 2 relay is executed, a special layer may be established. The special layer is, for example, an adaptation layer. The adaptation layer may be a layer higher than the RLC layer in Layer 2. The adaptation layer may be a higher layer immediately above the RLC layer. The adaptation layer may be a layer different from the PDCP layer. The adaptation layer may be a layer lower than the PDCP layer. The adaptation layer may be a lower layer immediately below the PDCP layer. The adaptation layer may be established between the RLC layer and the PDCP layer.

User data and/or control information is transmitted between the adaptation layer of the UE 100-1 and the adaptation layer of the UE 100-2. The user data and/or control information is transmitted between the adaptation layer of the UE 100-1 and the adaptation layer of the eNB 200.

In the adaptation layer, processing of the packet of the UE 100-2 is executed. For example, in the adaptation layer, processing of adding a new header to the packet of the UE 100-2 may be executed. In the adaptation layer, processing for understanding the contents of the new header added to the packet of the UE 100-2 may be executed (for example, see an operation example 3 described later).

(Radio Terminal)

Figure 6:
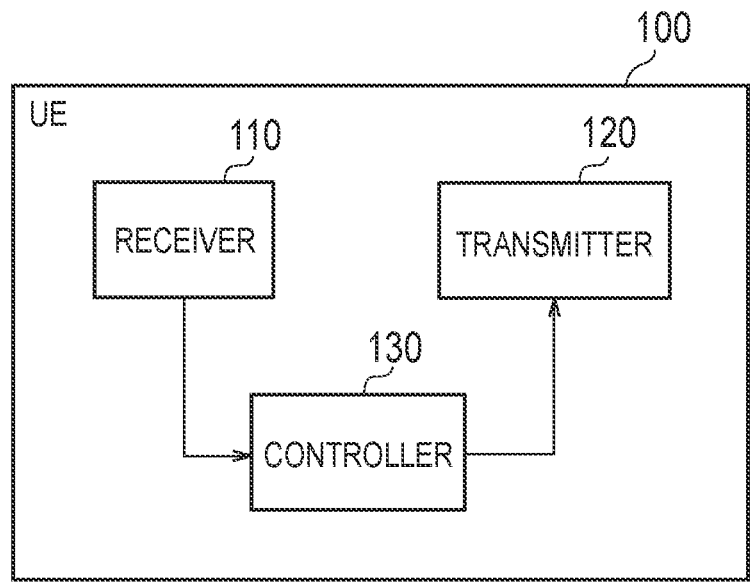
FIG. 6 is a block diagram of a UE 100.

The UE 100 (radio terminal) according to the embodiment will be described. FIG. 6 is a block diagram of the UE 100. As illustrated in FIG. 6, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit).

The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

(Base Station)

Figure 7:
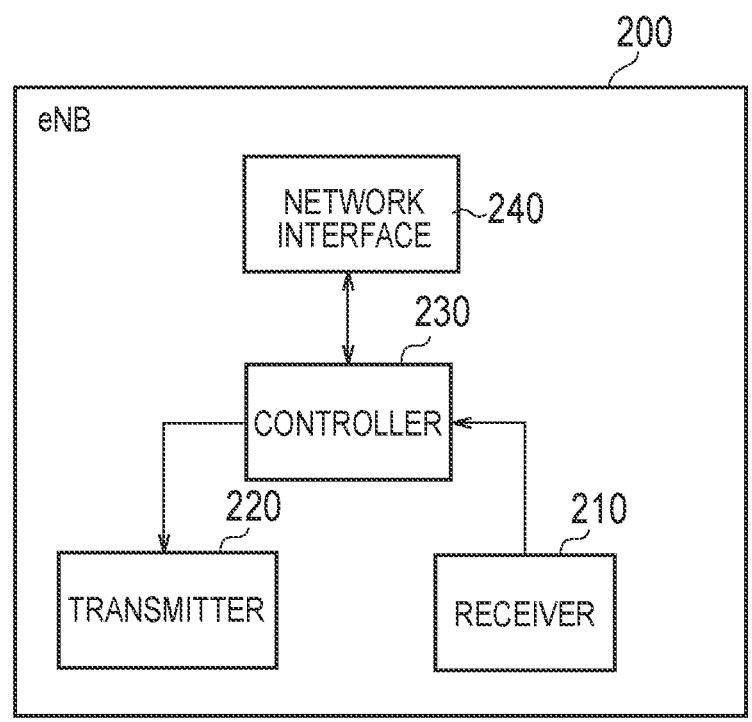
FIG. 7 is a block diagram of an eNB 200.

The eNB 200 (base station) according to the embodiment will be described. FIG. 7 is a block diagram of the eNB 200. As illustrated in FIG. 7, the eNB 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour eNB 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the eNB 200 is described herein as a process (operation) executed by the eNB 200.

(Operation According to Embodiment)

An operation according to the embodiment will be described by taking operation examples 1 to 9 as examples.

(A) Operation Example 1

Figure 8:
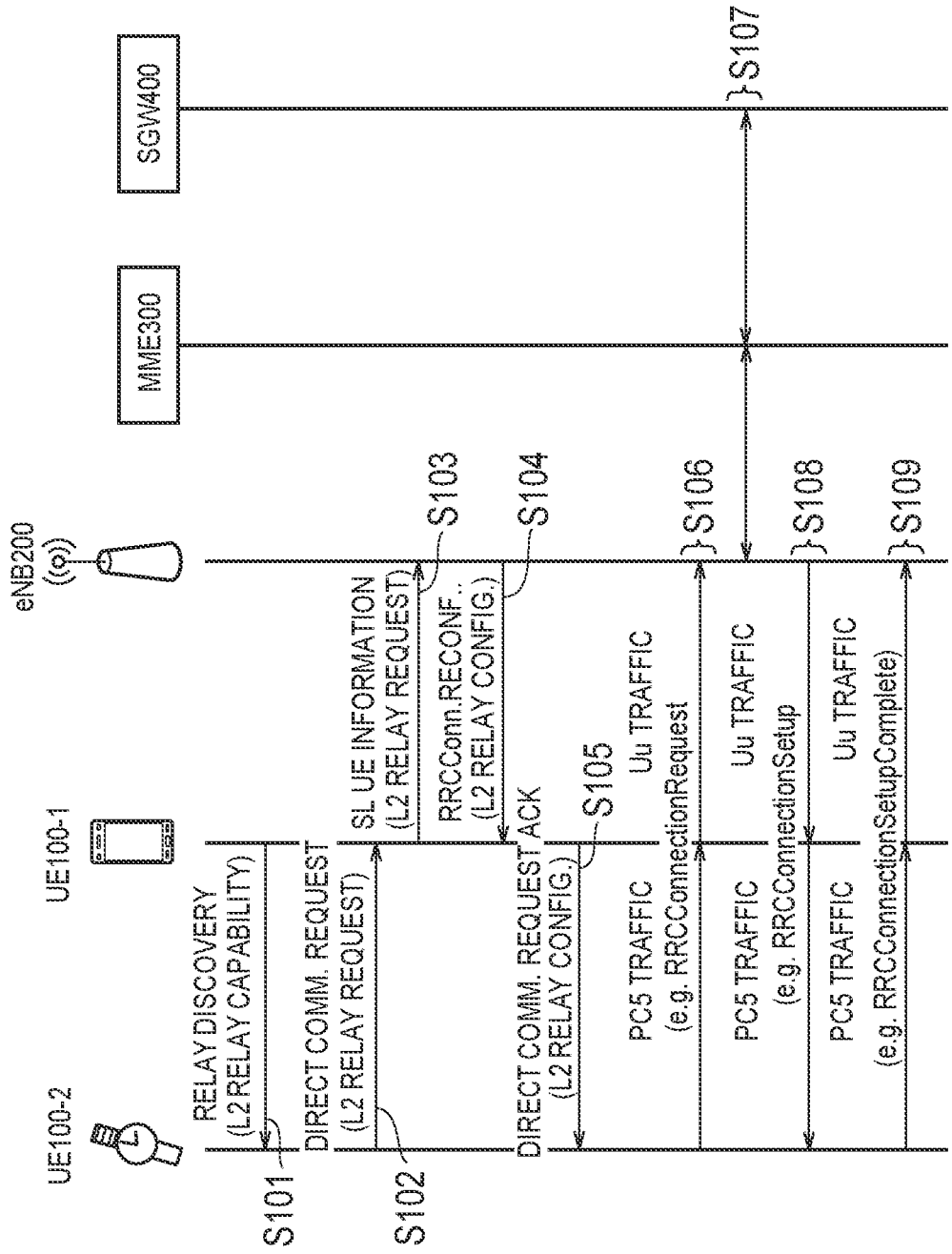
FIG. 8 is a sequence diagram for describing an operation example 1.

An operation example 1 will be described with reference to FIG. 8. FIG. 8 is a sequence diagram for describing the operation example 1.

In the operation example 1, an example of an operation for setting the layer 2 relay will be described.

The UE 100-1 is a UE capable of executing the layer 2 relay. The UE 100-1 may be a ProSe UE-to-Network Relay. The UE 100-1 exists in the cell of the eNB 200-1. The UE 100-1 may be in an RRC connected state with the eNB 200 (cell) in an initial state. The UE 100-1 may be in an RRC idle state with the eNB 200 (cell) in an initial state.

The UE 100-2 is a UE capable of executing communication with the network via the UE 100-1 by the layer 2 relay. The UE 100-2 may be a Remote UE. The UE 100-2 may receive a packet from the network (eNB 200) via the UE 100-1 by the layer 2 relay. The UE 100-2 may transmit a packet to the network (eNB 200) via the UE 100-1 by the layer 2 relay.

The UE 100-2 may exist in the cell of the eNB 200. The UE 100-2 may not exist in the cell of the eNB 200. The UE 100-2 may be within the cell coverage (In Coverage). The UE 100-2 may be outside the cell (Out-of-coverage).

The UE 100-2 may be a wearable UE (wUE). The wearable UE is, for example, a communication device that a user can wear. The wearable UE may be a short-range device. The wearable UE may be a communication device that is assumed to be used in direct exchange of a radio signal between terminals, such as a side link operation, being executed in a short distance (within a range of several meters (for example, 2 m)).

In the present specification, the "short range" may be defined as a communicable distance (for example, a range of several meters). For example, the maximum reachable distance (maximum reachable range) of a radio signal (sidelink signal) between short-range devices (UE-wUE/wUE-wUE) may be shorter than the maximum reachable distance of the radio signal (sidelink signal) between normal UEs (UE-UE). The maximum reachable distance of the radio signal (sidelink signal) between the short-range devices may be shorter than the maximum reachable distance of an uplink signal between a UE and an eNB.

The "short range" may be defined as a (maximum) transmission power (for example, a maximum transmission power of 0 dBm or less) of a radio signal (sidelink signal) between the short-range devices. For example, the maximum transmission power of a radio signal (sidelink signal) between short-range devices (UE-wUE/wUE-wUE) may be smaller than the maximum transmission power of a radio signal (sidelink signal) between normal UEs (UE-UE). The maximum transmission power of a radio signal (sidelink signal) between short-range devices may be smaller than the maximum transmission power of an uplink signal between a UE and an eNB.

The "short range" may be defined by (the conditions/settings of) a resource pool which the wearable UE can utilize.

Unlike an existing UE 100, the wearable UE may not require mounting of an existing SIM (Subscriber Identity Module Card). A SIM for short range (D2D SIM) may be mountable in the wearable UE.

As illustrated in FIG. 8, in step S101, the UE 100-1 may transmit information indicating that the UE 100-1 is capable of executing the layer 2 relay. The information may be, for example, information indicating the capability of the layer 2 relay (L2 Relay capability).

The UE 100-1 may include the information into a discovery message for relay (Relay discovery). The UE 100-1 may include the information into a message for requesting direct communication (Direct communication Request).

Step S101 may be omitted. For example, when device to device communication between the UE 100-1 and the UE 100-2 is executed/being executed by non-3GPP access technology, the UE 100-1 may omit transmission of the information indicating that the UE 100-1 is capable of executing the layer 2 relay.

In step S102, the UE 100-2 transmits a first request (L2 relay Request) being a request for the layer 2 relay to the UE 100-1. The UE 100-2 may transmit a message including information indicating the request to the UE 100-1. For example, the UE 100-2 may include information indicating a request for the layer 2 relay into a message for requesting direct communication (Direct Comm. Request).

In response to receiving the information indicating that the UE 100-1 is capable of executing the layer 2 relay, the UE 100-2 may transmit the information indicating a request for the layer 2 relay to the UE 100-1. Thus, the UE 100-2 can transmit the information indicating a request for the layer 2 relay to the UE 100-1 only when the layer 2 relay can be executed. Thus, the UE 100-2 can avoid transmitting the information indicating the request for the layer 2 relay to the UE 100-1 even though the UE 100-1 cannot execute the layer 2 relay.

Even if the UE 100-2 does not receive the information indicating that the UE 100-1 is capable of executing the layer 2 relay, the UE 100-2 may transmit the information indicating a request for the layer 2 relay to the UE 100-1. For example, when device to device communication between the UE 100-1 and the UE 100-2 is executed/being executed by non-3GPP access technology, the UE 100-2 may transmit the information indicating a request for the layer 2 relay to the UE 100-1.

The UE 100-2 may transmit the information indicating a request for the layer 2 relay to the UE 100-1 via the PC5 interface. The UE 100-2 may transmit the information indicating a request for the layer 2 relay to the UE 100-1 by using the PC5 protocol.

In step S103, the UE 100-1 transmits a second request (L2 relay request) being a request for the layer 2 relay to the eNB 200. For example, the UE 100-1 may include the information indicating a request for the layer 2 relay into sidelink UE information (SL UE information).

For example, the UE 100-1 may transmit the second request to the eNB 200 each time the UE 100-1 receives the first request from each Remote UE 100.

When receiving the first request from each of a plurality of Remote UEs 100, the UE 100-1 may transmit the second request with one message. That message may include an identifier of each of the plurality of Remote UEs 100.

When receiving the first request from each of the plurality of Remote UEs 100, the UE 100-1 may not transmit the second request. The UE 100-1 may request the eNB 200 for a transmission resource for direct communication. The UE 100-1 may transmit a buffer status report (SL-BSR) for the sidelink to the eNB 200. The SL-BSR is for providing information on an amount of data available for transmission between terminals to the eNB (serving eNB) 200. For example, the amount of data available may be an amount of data (packets) to be transmitted by the layer 2 relay. The amount of data available may be the total data amount of data to be transmitted held by a plurality of UEs 100-2. In step S102, each of the Remote UEs 100 may notify the UE 100-1 of the amount of data to be transmitted.

The eNB 200 receives the second request from the UE 100-1. The eNB 200 may determine whether to permit or reject the second request.

In step S104, the eNB 200 can transmit a response to the second request to the UE 100-1. The eNB 200 may transmit, for example, an RRC connection reconfiguration message (RRCConn.Reconf.) to the UE 100-1 as a response message.

When permitting the layer 2 relay, the eNB 200 may include, into the response message, information (L2 relay config.) for setting the layer 2 relay.

The eNB 200 may include, into the response message, information indicating that a special layer (for example, adaptation layer) is used in the layer 2 relay. For example, the eNB 200 may determine whether to execute the layer 2 relay via the adaptation layer. For example, the eNB 200 may include, into the response message, information indicating that the layer 2 relay is executed via the adaptation layer. For example, the eNB 200 may include, into the response message, information indicating that the layer 2 relay is executed without going through the adaptation layer.

When receiving the SL BSR from the UE 100-1, the eNB 200 may allocate a radio resource according to the data amount. The response message may include information indicating the allocated radio resource. The eNB 200 may include, into the response message, a radio resource pool including a plurality of radio resources.

In the case where the eNB 200 rejects the second request, the eNB 200 may transmit a message indicating the rejection to the UE 100-1. In this case, the UE 100-1 may transmit a message indicating that the layer 2 relay is rejected to the UE 100-2. The UE 100-1 may transmit a message (Direct Comm. Request NACK) for rejecting the direct communication request, to the UE 100-2.

In the following description, a description will be given on the assumption that the eNB 200 has permitted the layer 2 relay.

In step S105, the UE 100-1 transmits a response to the first request to the UE 100-2. The UE 100-1 may transmit a message for acknowledging the direct communication request (Direct Comm. Request ACK) to the UE 100-2.

The UE 100-1 may transmit information for setting the layer 2 relay (L2 relay config.) to the UE 100-2. That information may be setting information received from the eNB 200 by the UE 100-1.

For example, the UE 100-2 may determine, based on the information received from the UE 100-1, whether or not transmission of a packet via the adaptation layer is permitted in the layer 2 relay.

In the following steps S106, S108 and S109, traffic of the UE 100-2 (for example, PC5 traffic) is transmitted between the UE 100-1 and the UE 100-2 by the layer 2 relay. By the layer 2 relay, traffic (for example, Uu traffic) of the UE 100-2 is transmitted between the UE 100-1 and the eNB 200. The UE 100-2 can transmit traffic using a radio resource (radio resource pool) allocated by the eNB 200.

In step S106, the UE 100-2 may transmit a message for requesting an RRC connection (RRCConnectionRequest) to the eNB 200 via the UE 100-1.

In step S107, a signaling for establishing an RRC connection to the UE 100-2 may be transmitted between the eNB 200 and an upper node (MME 300/SGW 400).

In step S108, the eNB 200 may transmit a message (RRCConnectionSetup) for setting up the RRC connection to the UE 100-2 via the UE 100-1.

Based on that message, the UE 100-2 starts setup for establishing the RRC connection. When the setup is completed, the UE 100-2 executes the process of step S109.

In step S109, the UE 100-2 may transmit a message (RRCConnectionSetup Complete) indicating that the setup of the RRC connection has been completed to the eNB 200 via the UE 100-1.

As described above, since the RRC connection is established between the network and the UE 100-2, the network can provide a service to the UE 100-2 as with a normal UE 100. For example, the network can identify (the location of) the UE 100-2. The network can call the UE 100-2. The network can deliver data to the UE 100-2.

After the RRC connection is established, the UE 100-2 also transmits traffic (user data/packet) of the UE 100-2 via the UE 100-1 by the layer 2 relay.

As with the existing UE 100, the UE 100-2 can execute a procedure for releasing the RRC connection via the UE 100-1.

(B) Operation Example 2

Figure 9:
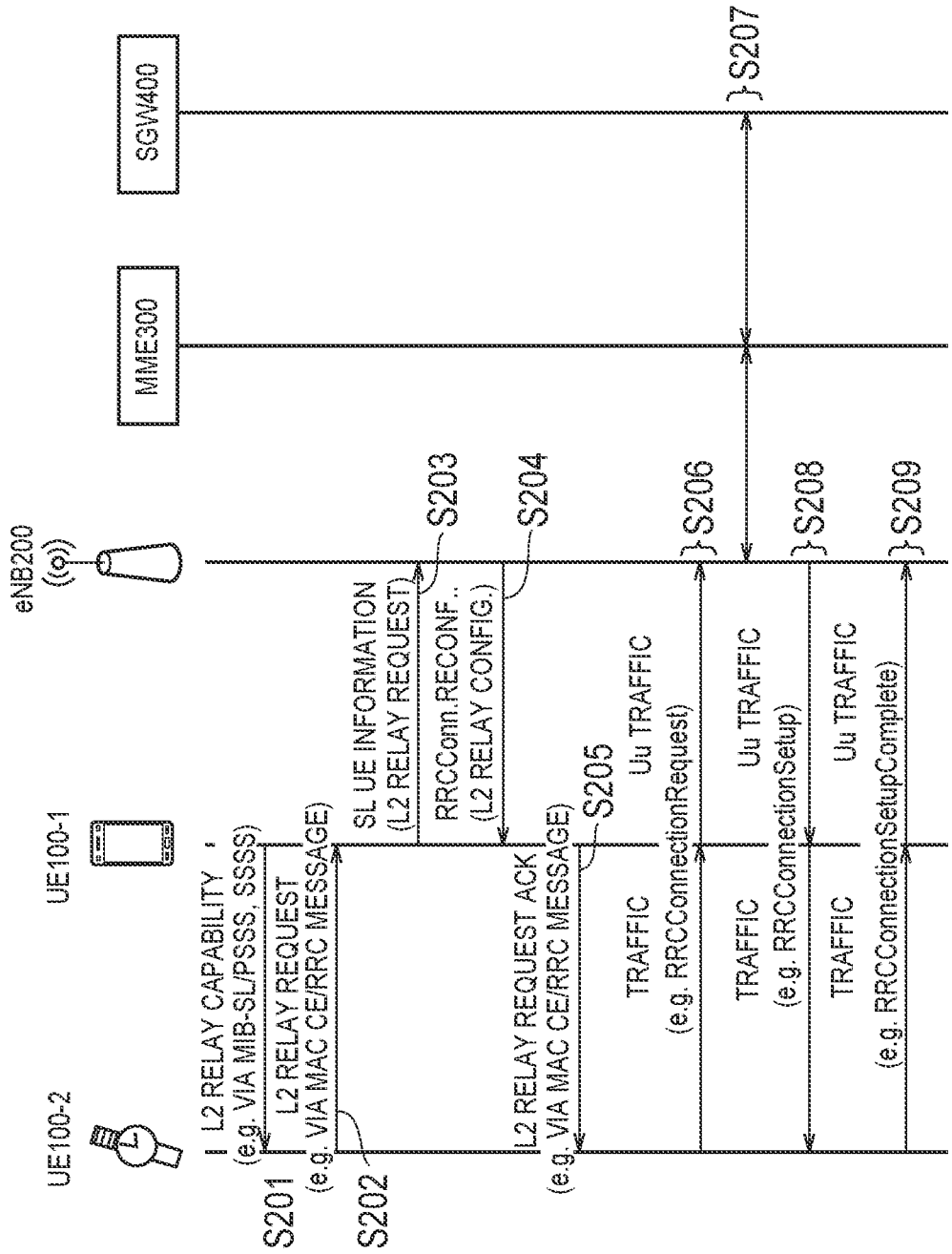
FIG. 9 is a sequence diagram for describing an operation example 2.

An operation example 2 will be described with reference to FIG. 9. FIG. 9 is a sequence diagram for describing the operation example 2.

In the operation example 2, the layer 2 relay can be set without using the PC5 protocol. Explanations similar to those described above are omitted.

In step S201, the UE 100-1 may transmit information indicating that the UE 100-1 is capable of executing the layer 2 relay by a message different from the PC5 message.

For example, the UE 100-1 may include, into an MIB-SL (MasterInformationBlock-SL) message, information (L2 Relay capability) indicating that the UE 100-1 is capable of executing the layer 2 relay. The UE 100-1 may indicate that the UE 100-1 is capable of executing the layer 2 relay by a sequence (signal sequence) of an SLSS (Sidelink Synchronization Signal).

The MIB-SL message is a message for carrying the sidelink common control information. The MIB-SL message includes information transmitted by a UE (that is, a UE operating as a synchronous reference) transmitting the SLSS via SL-BCH.

The SLSS is a synchronization signal in the sidelink. The SLSS is comprised of a PSSS (Primary Sidelink Synchronization Signal) and a SSSS (Secondary Sidelink Synchronization Signal). The sequence indicating that the UE 100-1 is capable of executing the layer 2 relay may be a sequence of the PSSS. It may be a sequence of the SSSS.

Based on the message from the UE 100-1, the UE 100-2 can determine whether the UE 100-1 is capable of executing the layer 2 relay. When the UE 100-1 is capable of executing the layer 2 relay, the UE 100-2 can execute the process of step S202. Even when the UE 100-2 does not receive the L2 Relay capability from the UE 100-1, the UE 100-2 may execute the process of step S202.

In step S202, the UE 100-2 may transmit a request (first request) for the layer 2 relay to the UE 100-1 by a message different from the PC5 message.

For example, the UE 100-2 may include, into MAC CE (MAC Control Element), information indicating the first request. The UE 100-2 may include, into a PDCP header, information indicating the first request. The UE 100-2 may include, into an RRC message, information indicating the first request. Including, into a message of the higher layer than the RLC layer, the information indicating the first request allows the UE 100-2 to transmit the first request to the UE 100-1, regardless of whether the packet transmission (relay) between the UEs is 3GPP access technology or non-3GPP access technology.

Steps S203 and S204 correspond to steps S103 and S104.

In step S205, the UE 100-1 may transmit a response to the first request to the UE 100-2 by a message different from the PC5 message.

For example, the UE 100-1 may include, into MAC CE, information indicating the response to the first request. The UE 100-1 may include, into a PDCP header, information indicating the response to the first request. The UE 100-1 may include, into an RRC message, information indicating the response to the first request. The UE 100-1 may transmit the same type of response as the first request of the UE 100-2. For example, when receiving the first request by the MAC CE, the UE 100-1 may transmit the response to the first request by the MAC CE.

According to the above, the layer 2 relay can be set to the UE 100 (UE 100-2) without using the PC5 protocol which is a higher layer. Therefore, the layer 2 relay can be started earlier than the layer 3 relay set according to the PC5 protocol.

(C) Operation Example 3

Figure 10:
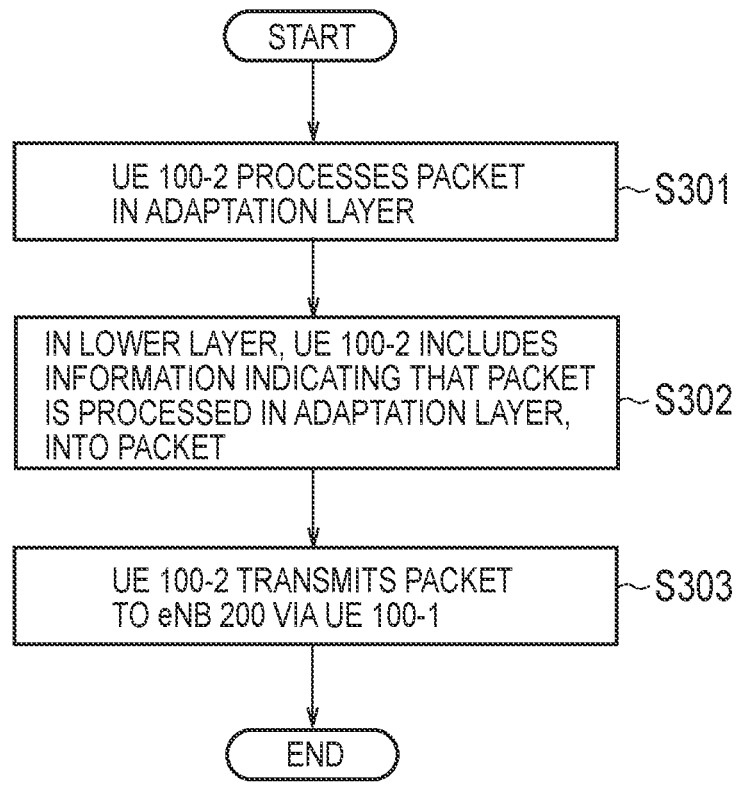
FIG. 10 is a flowchart for describing an operation example 3.
Figure 11:
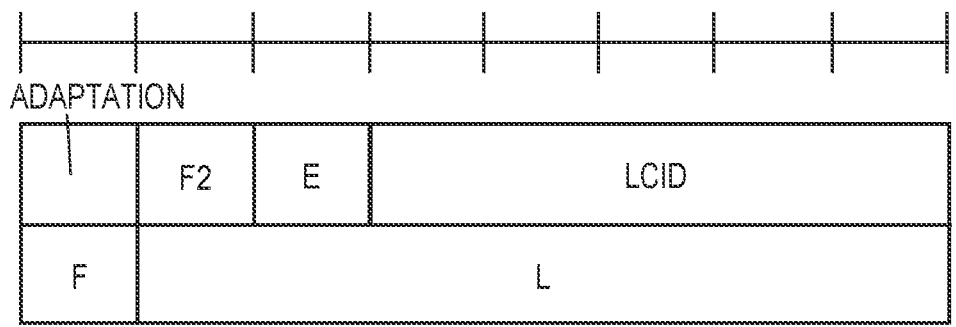
FIG. 11 is a diagram for describing the operation example 3.
Figure 12:
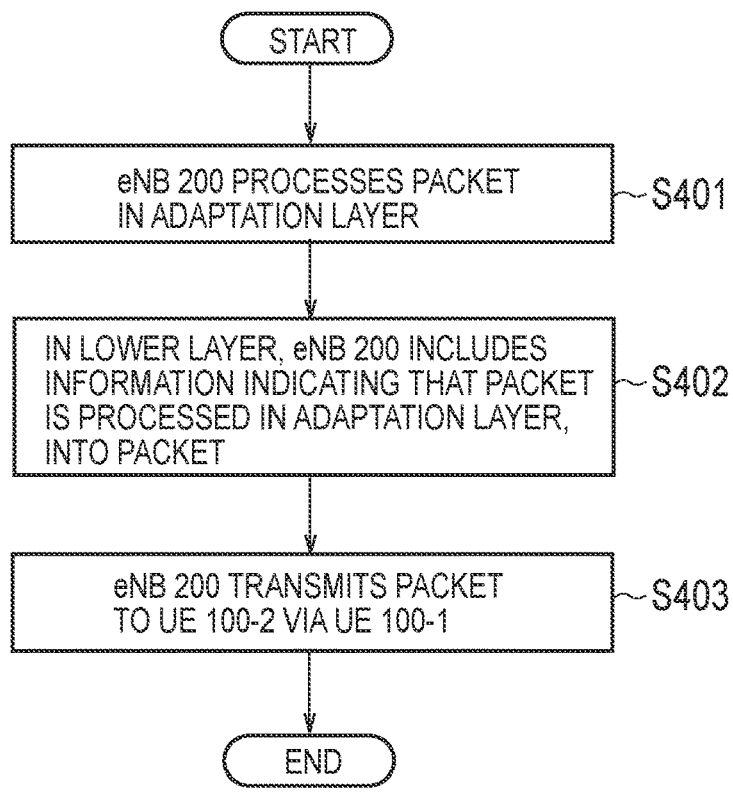
FIG. 12 is a flowchart for describing the operation example 3.

An operation example 3 will be described with reference to FIG. 10 to FIG. 12. FIG. 10 is a flowchart for describing the operation example 3. FIG. 11 is a diagram for describing the operation example 3. FIG. 12 is a flowchart for describing the operation example 3.

In the operation example 3, an example of an operation of the layer 2 relay using the adaptation layer will be described. Explanations similar to those described above are omitted.

As illustrated in FIG. 10, in step S301, the UE 100-2 processes a packet for transmission in the adaptation layer. For example, the UE 100-2 may include, into the packet, an identifier indicating a UE (UE 100-2) being a transmission source. In the adaptation layer, the UE 100-2 may include, into a header (new header) to be added to the packet, the identifier of the UE 100-2. An example of the identifier of the UE 100-2 will be described later (see an operation example 7).

The UE 100-2 may include, into the packet, packet priority information. In the adaptation layer, the UE 100-2 may include, into the header added to the packet, the packet priority information.

In step S302, the UE 100-2 includes, into the packet, information (Adaptation) indicating that the packet has been processed in the adaptation layer in a lower layer than the adaptation layer. For example, the UE 100-2 may include, in the MAC layer, the information into the packet.

As illustrated in FIG. 11, the UE 100-2 may include, for example, into the MAC subheader generated for each MAC SDU (MAC Service Data Unit), that information (Adaptation). The UE 100-2 may include that information into the MAC header.

The UE 100-2 may include that information into the header of a packet to be transmitted by non-3GPP access technology. For example, as that information, a parameter (EtherType) of LWA EtherType used in LWA (LTE WLAN Aggregation) may be diverted. The EtherType may be used to determine whether a received packet is to be processed in the adaptation layer (the received packet is to be transmitted to the adaptation layer). The UE 100-2 may include EtherType into the header of a packet to be transmitted by 3GPP access technology.

In step S303, the UE 100-2 processes, in the physical layer, the packet processed in the MAC layer, and then transmits the resulting packet to the eNB 200 via the UE 100-1.

Specifically, when processing the packet received from the UE 100-2 in the MAC layer, the UE 100-1 detects information indicating that the packet has been processed in the adaptation layer. Thus, the UE 100-1 grasps that the packet has been processed at the adaptation layer. That is, the UE 100-1 grasps that it is traffic going through the adaptation layer. The UE 100-1 processes the packet in the adaptation layer.

On the other hand, when the UE 100-1 does not detect information indicating that the packet has been processed in the adaptation layer in the packet received from the UE 100-2, the UE 100-1 omits processing in the adaptation layer.

The UE 100-1 may determine whether to process the packet in the adaptation layer based on the information (EtherType) included in the header of the packet. For example, when the EtherType indicates that the packet has been processed in the adaptation layer, the UE 100-1 processes the packet in the adaptation layer. When the EtherType indicates that the packet has not been processed in the adaptation layer, the UE 100-1 omits the processing in the adaptation layer.

Thereafter, the UE 100-1 transfers (relays) the packet received from the UE 100-2 to the eNB 200.

As with the UE 100-1, the eNB 200 detects information indicating that the packet has been processed in the adaptation layer from the packet (for example, the MAC sub-header) received from the UE 100-1.

By this detection, the eNB 200 grasps that the packet has been processed in the adaptation layer. The eNB 200 processes the packet in the adaptation layer. When the identifier of the UE 100-2 indicating the transmission source (packet originator) of the packet is included in the adaptation layer, the eNB 200 can grasp that the transmission source of the packet is the UE 100-2. Thus, the eNB 200 can grasp the transmission source (packet originator) of the packet in the adaptation layer. The eNB 200 does not have to execute a process of grasping the transmission source (packet originator) of the packet in the IP layer being a higher layer like the layer 3 relay.

In the above description, the layer 2 relay for the uplink has been described, but the similar operation may be executed also in the layer 2 relay for the downlink.

As illustrated in FIG. 12, in step S401, the eNB 200 processes a packet for transmission in the adaptation layer. For example, the eNB 200 may include, into the packet, an identifier indicating a UE (UE 100-2) being the transmission destination. In the adaptation layer, the eNB 200 may include, into a header (new header) to be added to the packet, the identifier of the UE 100-2. The identifier is the identifier of the final transmission destination.

In step S402, in a lower layer than the adaptation layer, the eNB 200 includes, into the packet, information indicating that the packet has been processed in the adaptation layer. For example, the eNB 200 may include, in the MAC layer, the information into the packet.

In step S403, the eNB 200 processes the packet processed in the MAC layer in the physical layer and then transmits the processed packet to the UE 100-2 via the UE 100-1.

The UE 100-1 determines whether or not the packet received from the eNB 200 includes information indicating that the packet has been processed in the adaptation layer, as described above. When the UE 100-1 grasps that it is traffic going through the adaptation layer, the UE 100-1 executes processing in the adaptation layer. When the UE 100-1 grasps that it is not traffic going through the adaptation layer, the UE 100-1 omits the processing in the adaptation layer.

In the adaptation layer, the UE 100-1 may grasp the transmission destination of the packet based on the identifier indicating the transmission destination UE (UE 100-2) included in the new header. Thus, the UE 100-1 does not need to execute a process of grasping the transmission source (packet originator) of the packet in the IP layer being a higher layer.

Thereafter, the UE 100-1 transfers (relays), to the UE 100-2, the packet received from the eNB 200.

(D) Operation Example 4

Figure 13:
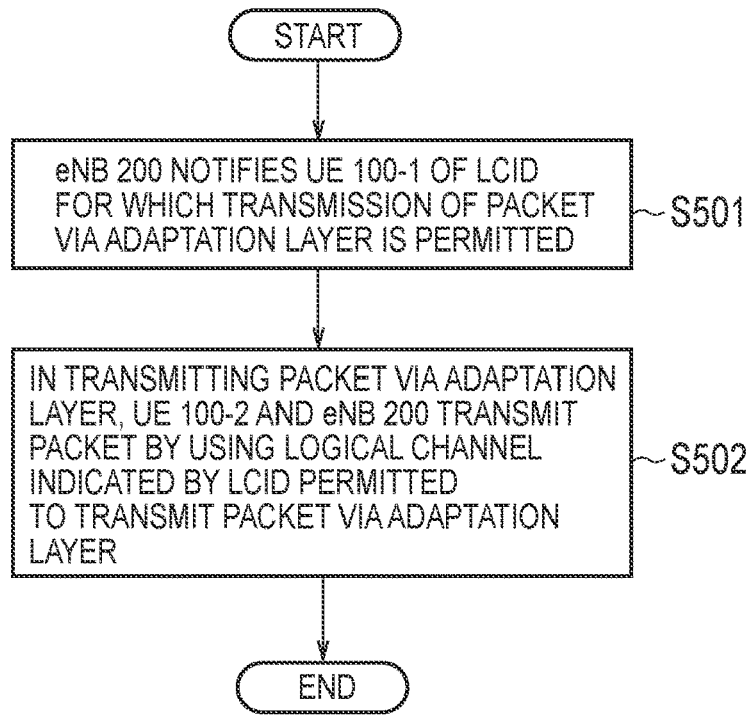
FIG. 13 is a flowchart for describing an operation example 4.

An operation example 4 will be described with reference to FIG. 13. FIG. 13 is a flowchart for describing the operation example 4.

In the operation example 4, an example of the operation of the layer 2 relay using the adaptation layer will be described. Explanations similar to those described above are omitted.

As illustrated in FIG. 13, in step S501, the eNB 200 assigns a logical channel identifier (LCID: Logical Channel ID) used for the layer 2 relay to the UE 100-1. That LCID is an LCID used between the UE 100-1 and the eNB 200. The eNB 200 may notify the UE 100-1 of an LCID that is permitted to transmit the packet via the adaptation layer. That is, the eNB 200 may permit transmission of a packet via the adaptation layer only with a predetermined LCID. The eNB 200 may determine the predetermined LCID from the already assigned LCIDs.

In step S502, when a packet is transmitted via the adaptation layer, the UE 100-1 and the eNB 200 transmit the packet using the logical channel indicated by the LCID permitted to transmit the packet via the adaptation layer. Thus, the UE 100-1 and the eNB 200 can grasp that the packet transmitted by the logical channel indicated by the LCID is a packet via the adaptation layer.

(E) Operation Example 5

Figure 14:
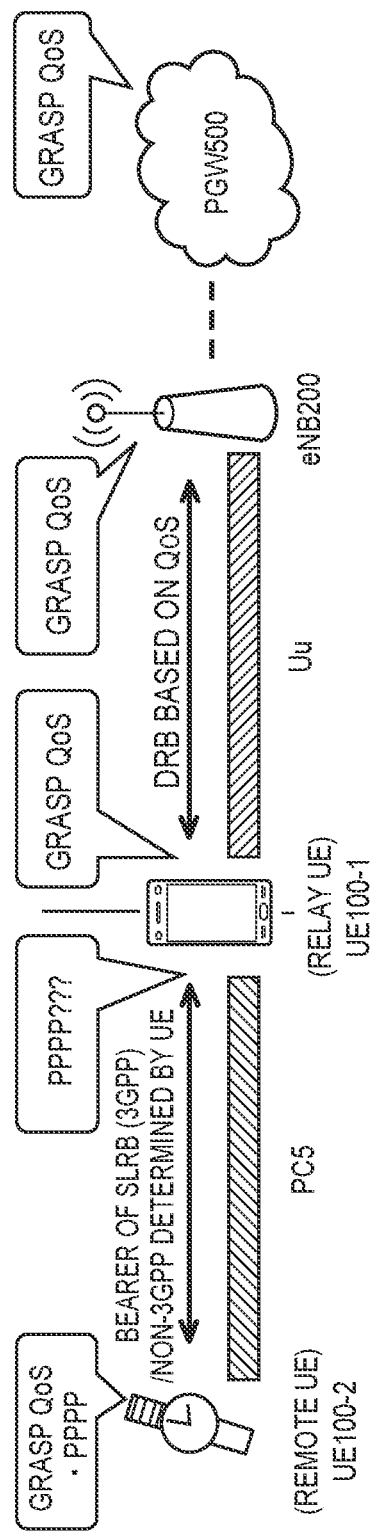
FIG. 14 is a diagram for describing an operation example 5.
Figure 15:
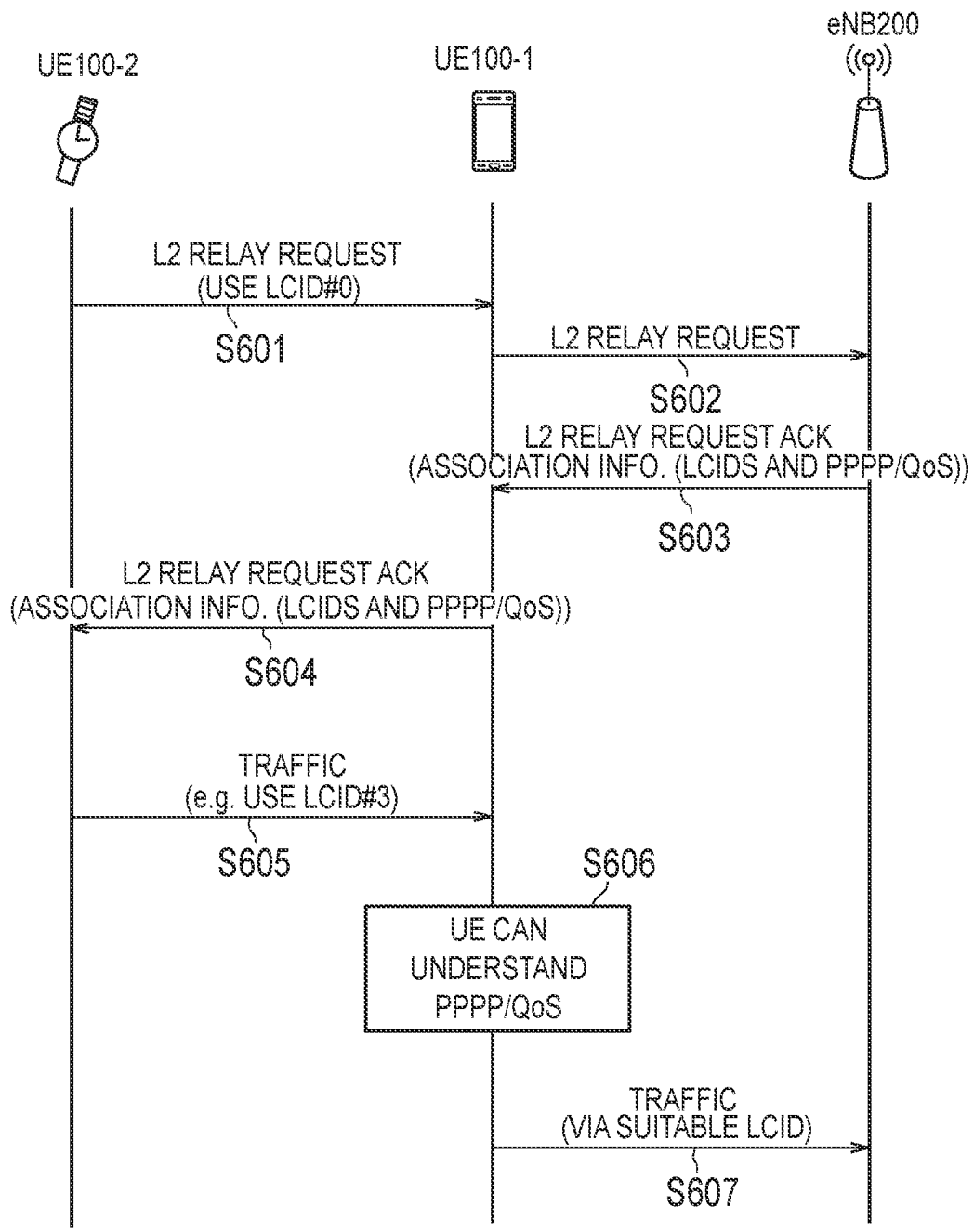
FIG. 15 is a sequence diagram for describing the operation example 5.

An operation example 5 will be described with reference to FIG. 14 and FIG. 15. FIG. 14 is a diagram for describing the operation example 5. FIG. 15 is a sequence diagram for describing the operation example 5.

As illustrated in FIG. 14, in the existing layer 3 relay, the UE 100-1 (Relay UE), when receiving a packet from the UE 100-2 (Remote UE), executes processing in the IP layer, thereby making it possible to grasp the priority of the packet (QoS (Quality of Service)/PPPP (ProSe Per-Packet Priority), etc.). However, in the layer 2 relay, since the UE 100-1 does not execute the processing in the IP layer, the UE 100-1 cannot grasp the priority of the packet. Therefore, when transmitting a packet from the UE 100-1 to the eNB 200 in the layer 2 relay, there is a possibility that a delay of a packet having a high priority occurs.

Accordingly, the following operation may be executed. Explanations similar to those described above are omitted.

As illustrated in FIG. 15, steps S601 and S602 correspond to steps S102 and S103. As described later, the UE 100-2 may transmit the first request (L2 Relay Request) to the UE 100-1 by using a predetermined LCID (LCID #0) available on the PC5 interface until an LCID is notified.

In step S603, as in step S104, the eNB 200 can transmit a response to the second request to the UE 100-1.

That response may include association information (Association info.) in which an LCID and a priority are associated with each other. The association information may be a list in which an LCID and a priority are associated with each other. The priority may be (a class of) PPPP. The priority may be (a class of) QoS. The LCID is an identifier of the logical channel between the UE 100-1 and the UE 100-2. The LCID is used for transmitting a packet between the UE 100-1 and the UE 100-2. In this way, the eNB 200 can specify an LCID available on the PC5 interface.

Thus, the eNB 200 can notify the UE 100-1 of a plurality of LCIDs associated with the priority.

In step S604, as in step S105, the UE 100-1 transmits a response to the first request to the UE 100-2. The response may include the association information.

Thus, the eNB 200 can notify the UE 100-2 of a plurality of LCIDs associated with the priority.

In step S605, the UE 100-2 selects an LCID corresponding to the priority of the packet from the plurality of LCIDs to transmit the packet to the UE 100-1.

For example, when the priority of the generated packet is high priority, the UE 100-2 selects an LCID (for example, LCID #1) associated with the high priority based on the association information. On the other hand, when the priority of the generated packet is low priority, the UE 100-2 selects an LCID (for example, LCID #3) associated with the low priority based on the association information.

The UE 100-2 transmits the packet (traffic) to the UE 100-1 by using the selected LCID (for example, LCID #3). That is, the UE 100-2 transmits the packet to the UE 100-1 by the logical channel identified by the selected LCID.

In step S606, the UE 100-1 understands the priority of the packet based on the LCID used for transmitting the packet received from the UE 100-2. By using the association information, the UE 100-1 can determine the priority associated with the LCID used for packet transmission as the priority of the packet. Thus, the UE 100-1 can grasp the priority of the packet.

In step S607, the UE 100-1 transmits that packet to the eNB 200 via a suitable LCID (radio bearer) corresponding to the priority of the packet.

As described above, the UE 100-1 can grasp the priority of the packet without having to grasp the priority of the packet by the processing in the IP layer.

(F) Operation Example 6

Figure 16:
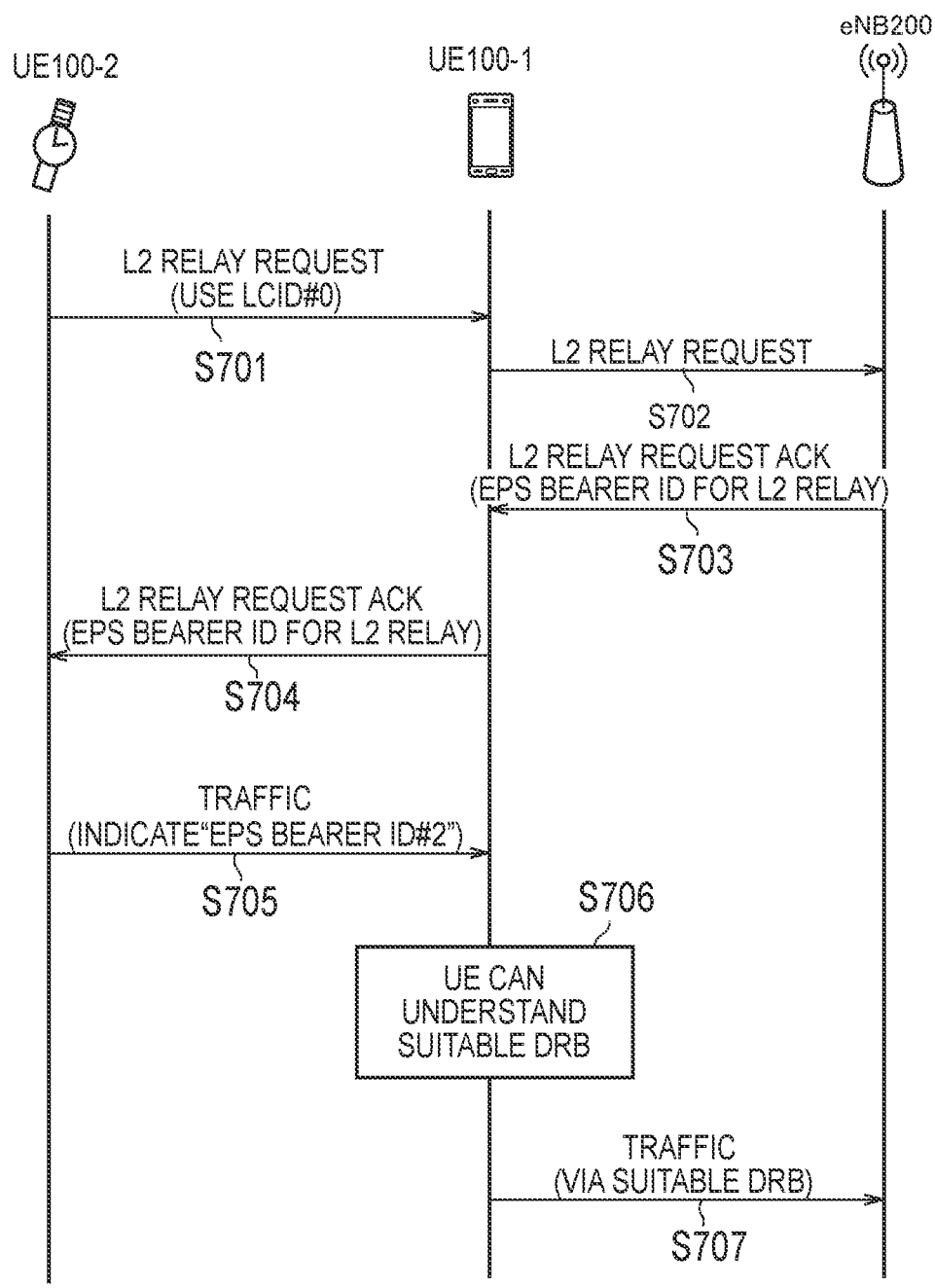
FIG. 16 is a sequence diagram for describing an operation example 6.
Figure 17:
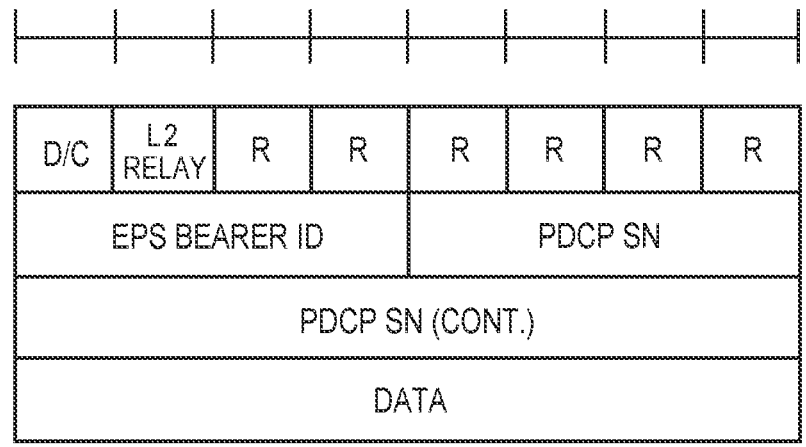
FIG. 17 is a diagram for describing the operation example 6.
Figure 18:
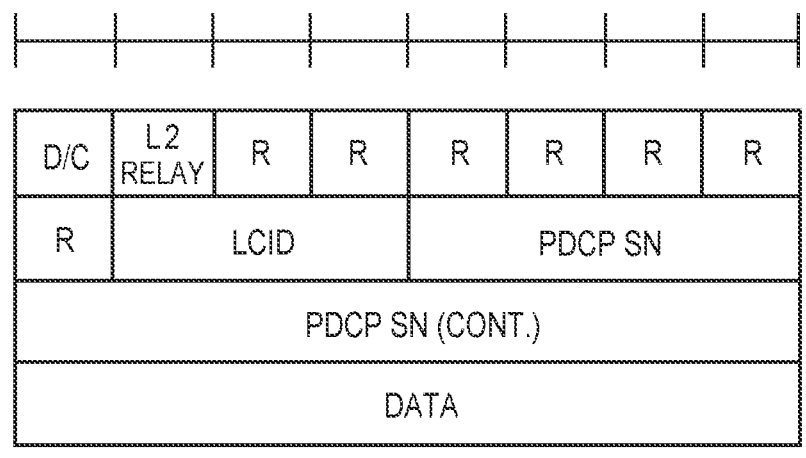
FIG. 18 is a diagram for describing the operation example 6.

An operation example 6 will be described with reference to FIG. 16 to FIG. 18. FIG. 16 is a sequence diagram for describing the operation example 6. FIG. 17 and FIG. 18 are diagrams for describing the operation example 6.

In the operation example 6, the UE 100-1 grasps the priority of the packet by a method different from that in the operation example 5. Explanations similar to those described above are omitted.

As illustrated in FIG. 16, steps S701 and S702 correspond to steps S601 and S602.

In step S703, the eNB 200 can transmit a response to the second request to the UE 100-1.

That response may include identification information associated with the priority. The response may include a list in which the identification information and the priority are associated with each other.

The identification information is, for example, an identifier of a bearer established between the UE 100-1 and the network. The identification information may be an identifier (EPS bearer ID for L2 Relay) of an EPS (Evolved Packet System) bearer between the UE 100-1 (or the UE 100-2) and the PGW 500. The identifier of the EPS bearer is the identifier of the EPS bearer used for the layer 2 relay.

The identification information may be an LCID used for transmitting a packet between the UE 100-1 and the eNB 200. That information may be a DRB ID (Data Radio Bearer ID) used for transmitting a packet between the UE 100-1 and the eNB 200.

Thus, the eNB 200 can notify the UE 100-1 of a plurality of pieces of identification information associated with the priority.

In step S704, the UE 100-1 transmits a response to the first request to the UE 100-2. The response may include identification information.

Thus, the eNB 200 can notify the UE 100-2 of a plurality of pieces of identification information associated with the priority.

In step S705, the UE 100-2 selects identification information corresponding to the priority of the packet from among the plurality of pieces of identification information to transmit the packet to the UE 100-1.

For example, when the priority of the generated packet is high priority, the UE 100-2 selects an EPS bearer ID (for example, EPS bearer ID #1) associated with the high priority based on the association information. On the other hand, when the priority of the generated packet is low priority, the UE 100-2 selects an EPS bearer ID (for example, EPS bearer ID #3) associated with the low priority based on the association information.

The UE 100-2 generates a packet to which a header including the selected identification information is added. For example, as illustrated in FIG. 17, the UE 100-2 generates a packet to which a header including the selected EPS bearer ID is added in the PDCP layer. As illustrated in FIG. 18, the UE 100-2 may generate a packet to which a header including the selected LCID is added in the PDCP layer.

The UE 100-2 may generate a packet (traffic) according to the PDCP format for the Uu interface instead of the PDCP format for the sidelink. Thus, in the UE 100-1, it is possible to reduce the process of conversion to the PDCP format for the Uu interface.

The UE 100-2 transmits the generated packet (traffic) to the UE 100-1.

In step S706, the UE 100-1 can grasp the priority of that packet based on the identification information included in the header of the packet. The UE 100-1 understands a suitable DRB (Data Radio Bearer) corresponding to the priority of the packet. The UE 100-1 can determine the priority associated with the identification information as the priority of the packet. Thus, the UE 100-1 can grasp the priority of the packet.

In step S707, the UE 100-1 transmits (transfers) the packet to the eNB 200 via the suitable DRB corresponding to the priority of the packet.

The UE 100-1 may use the EPS bearer/LCID corresponding to the identification information (EPS bearer ID/LCID) included in the header of the packet to transmit the packet.

As described above, the UE 100-1 can grasp the priority of the packet without having to grasp the priority of the packet by the processing in the IP layer.

(G) Operation Example 7

Figure 19:
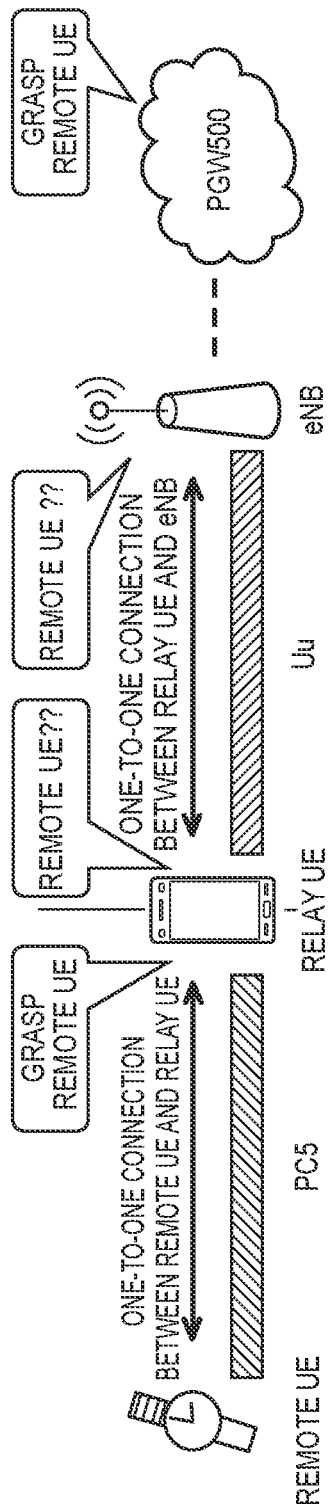
FIG. 19 is a diagram for describing an operation example 7.
Figure 20:
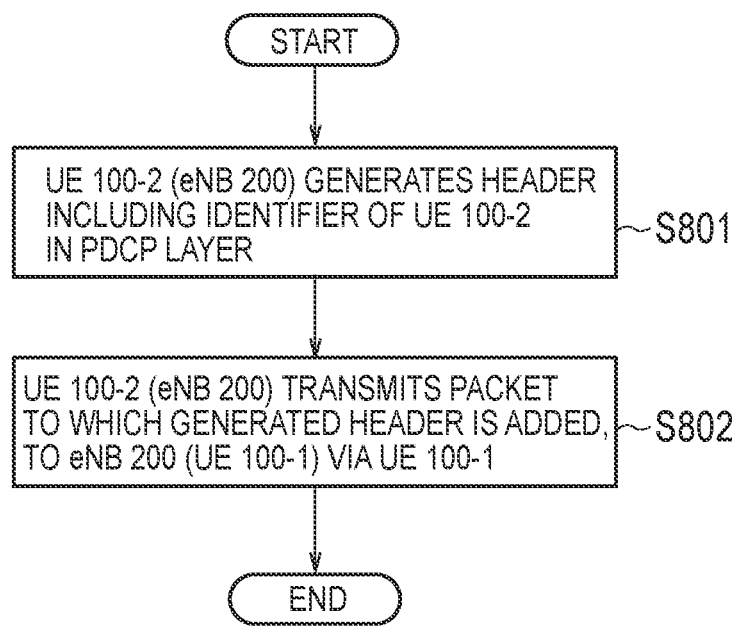
FIG. 20 is a flowchart for describing the operation example 7.
Figure 21:
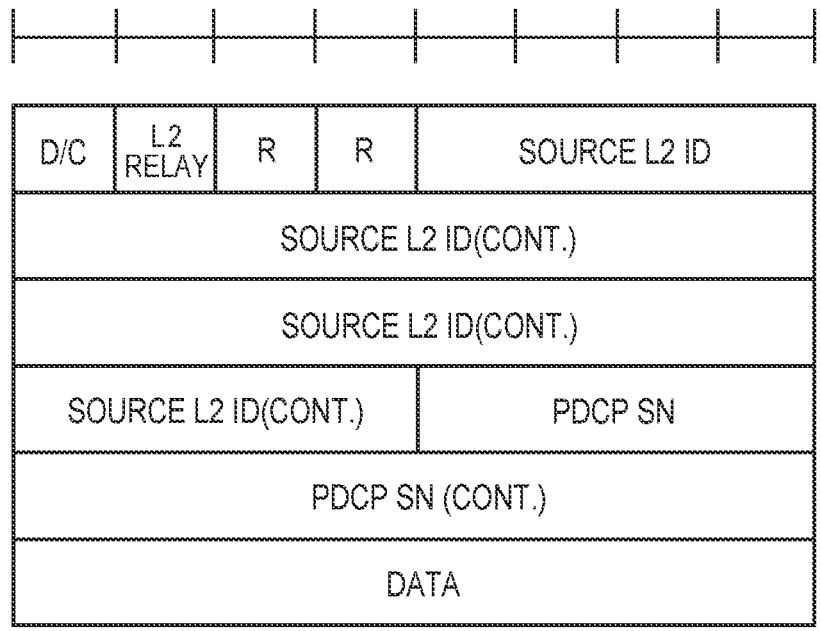
FIG. 21 is a diagram for describing the operation example 7.
Figure 22:
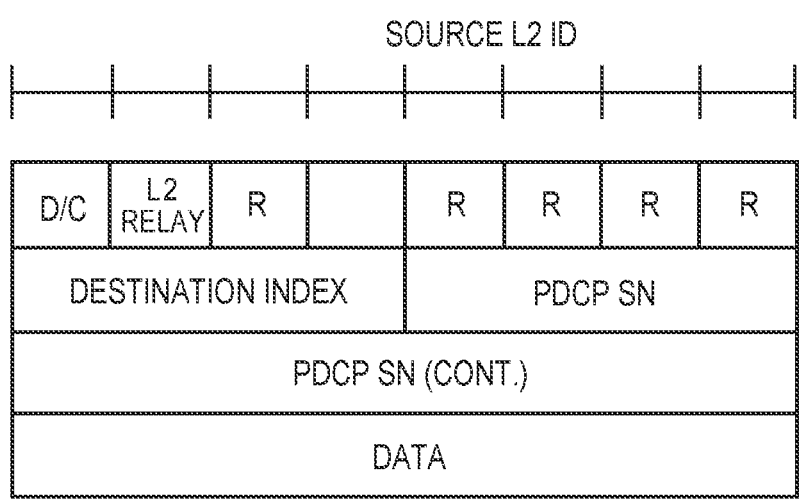
FIG. 22 is a diagram for describing the operation example 7.

An operation example 7 will be described with reference to FIG. 19 to FIG. 22. FIG. 19 is a diagram for describing the operation example 7. FIG. 20 is a flowchart for describing the operation example 7. FIG. 21 and FIG. 22 are diagrams for describing the operation example 7.

As illustrated in FIG. 19, in the layer 2 relay, the UE 100-1 does not execute processing in the IP layer, so there is a possibility that the UE 100-1 cannot grasp the relay destination (that is, the UE 100-2) of the packet from the eNB 200. Likewise, there is a possibility that the eNB 200 cannot grasp the originator (that is, the UE 100-2) of the packet from the UE 100-1. For this reason, there is a possibility that the layer 2 relay is not executed properly.

Accordingly, the following operation may be executed. Explanations similar to those described above are omitted.

As illustrated in FIG. 20, in step S801, the UE 100-2 generates, for example, a header including the identifier of the UE 100-2 in the PDCP layer (see FIG. 21 and FIG. 22). The UE 100-2 may generate a header including the identifier of the UE 100-2 in another layer.

The identifier of the UE 100-2 may be, for example, a ProSe ID assigned by the network to use the ProSe. The identifier of the UE 100-2 may be a Source L2 ID indicating the transmission source (see FIG. 21). The identifier of the UE 100-2 may be an index of the list of Remote UEs connected (Destination index) (see FIG. 22). That index is used when the relay UE reports to the network. The UE 100-2 may be notified of that index from the UE 100-1 or the eNB 200.

In step S802, the UE 100-2 transmits the packet (traffic) to which the generated header is added to the eNB 200 via the UE 100-1.

The eNB 200 can grasp the transmission source of the packet based on the identifier of the UE 100-2 included in that header.

Likewise, the eNB 200 can generate a header including the identifier of the UE 100-2 in the PDCP layer, for example.

When receiving the packet from the eNB 200, the UE 100-1 can grasp the transmission destination (relay destination) of the packet based on the identifier of the UE 100-2 included in the header.

As described above, the layer 2 relay can be executed properly.

(H) Operation Example 8

Figure 23:
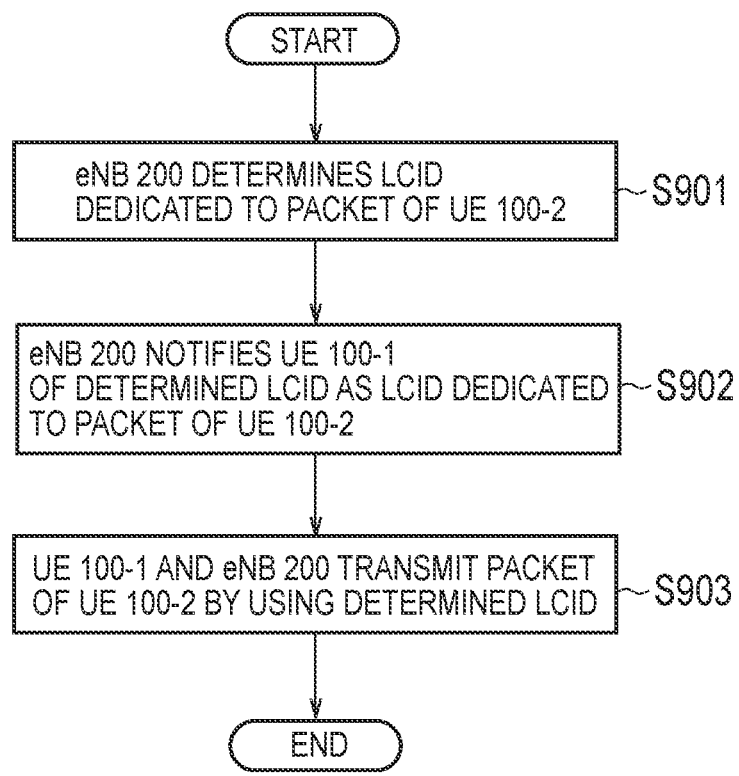
FIG. 23 is a flowchart for describing an operation example 8.

An operation example 8 will be described with reference to FIG. 23. FIG. 23 is a flowchart for describing the operation example 8.

In the operation example 8, the transmission destination/the transmission source of the packet is grasped by a method different from that in the operation example 7. Explanations similar to those described above are omitted.

In step S901, the eNB 200 determines an LCID dedicated to the packet of the UE 100-2. The eNB 200 may determine the dedicated LCID available for each Remote UE. The eNB 200 may determine a plurality of dedicated LCIDs for one Remote UE. The LCID is an LCID for transmitting a packet between the UE 100-1 and the eNB 200.

In step S902, the eNB 200 notifies the UE 100-1 of the determined LCID as an LCID dedicated to the packet of the UE 100-2.

In step S903, the UE 100-1 and the eNB 200 transmit the packet of the UE 100-2 by using the determined LCID. Thus, the UE 100-1 and the eNB 200 can grasp that the packet transmitted by using that LCID is a packet of the UE 100-2.

As described above, the layer 2 relay can be executed properly.

(I) Operation Example 9

Figure 24:
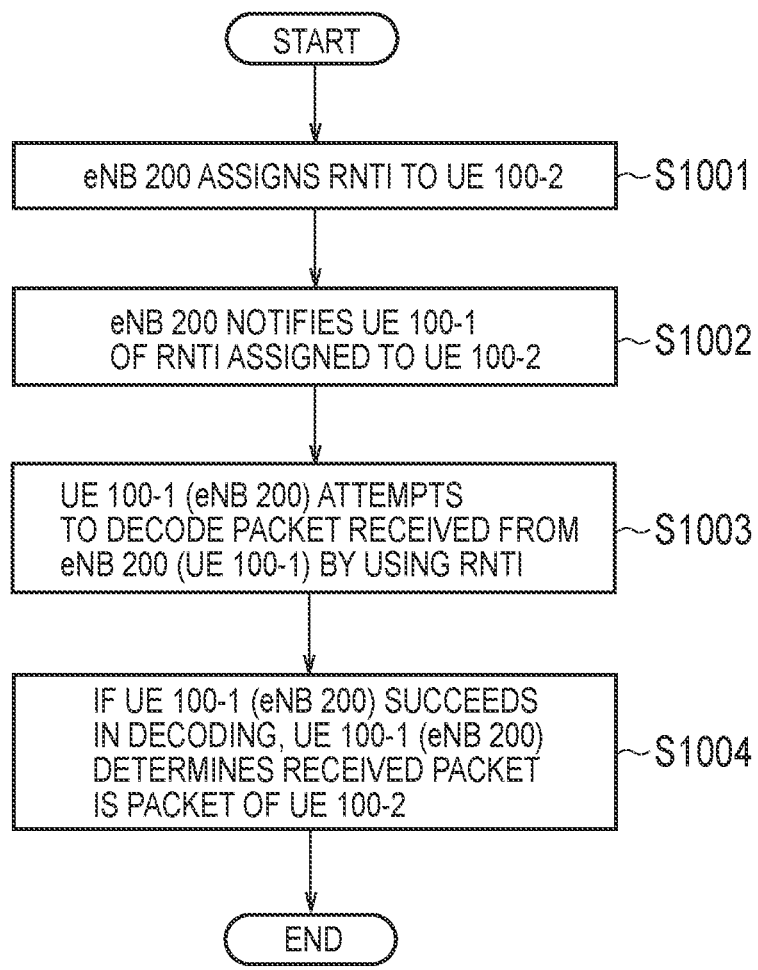
FIG. 24 is a flowchart for describing an operation example 9.

An operation example 9 will be described with reference to FIG. 24. FIG. 24 is a flowchart for describing the operation example 9.

In the operation example 9, the transmission destination and the transmission source of the packet is grasped by a method different from that in the operation examples 7 and 8. Explanations similar to those described above are omitted.

As illustrated in FIG. 24, in step S1001, the eNB 200 assigns an RNTI (Radio Network Temporary Identifier) to the UE 100-2. In response to receiving the second request, the eNB 200 may assign the RNTI to the UE 100-2. The RNTI may be, for example, a C-RNTI (Cell-RNTI).

In step S1002, the eNB 200 notifies the UE 100-1 of the RNTI assigned to the UE 100-2.

Thereafter, the eNB 200 encodes the packet of the UE 100-2 with that RNTI. The eNB 200 transmits the encoded packet to the UE 100-1.

In step S1003, the UE 100-1 attempts to decode the packet received from the eNB 200 with the RNTI assigned to the UE 100-2.

In step S1004, the UE 100-1 determines that the packet successfully decoded is a packet of the UE 100-2. The UE 100-1 determines that the packet failed to be decoded is not a packet of the UE 100-2.

The UE 100-1 transfers (relays) the packet successfully decoded to the UE 100-2.

Likewise, when receiving the packet from the UE 100-2, the UE 100-1 encodes the packet of the UE 100-2 with that RNTI. The UE 100-1 transmits the encoded packet to the UE 100-1.

The eNB 200 attempts to decode the packet received from the UE 100-1 with the RNTI assigned to the UE 100-2.

The eNB 200 determines that the packet successfully decoded is a packet of the UE 100-2. The eNB 200 transmits the packet successfully decoded to an upper network as the packet of the UE 100-2.

As described above, the layer 2 relay can be executed properly.

Other Embodiments

The contents of the present application are described according to the above-described embodiments, but it should not be understood that the discussion and the drawings constituting a part of this disclosure limit the contents of the present application. From this disclosure, various alternative embodiments, examples, and operational technologies will become apparent to those skilled in the art.

In the above description, in the case where the layer 2 relay is executed, the header (for example, the PDCP layer) of the packet may necessarily include information on the layer 2 relay between UEs (see the operation example 6). For example, the information on the layer 2 relay is, for example, the bearer ID (EPS bearer ID, DRB ID, LCID, etc.), the identifier of the UE 100-2 (identifier of the Remote UE), the priority information, or the like described above.

In the case where the layer 2 relay is executed, communication using the adaptation layer may be necessarily applied between UEs. Communication via the adaptation layer is necessarily executed between the UE 100-1 and the UE 100-2, so that determination as to whether or not to go through the adaptation layer may be omitted.

In the case where the communication using the adaptation layer is necessarily applied between the UEs, communication using the adaptation layer may be also applied between the UE and the eNB. Communication via the adaptation layer is necessarily executed also between the UE 100-1 and the UE 100-2 and also between the UE 100-1 and the eNB 200, so that determination as to whether or not to go through the adaptation layer may be omitted.

In the case where the communication using the adaptation layer is necessarily applied between the UEs, communication using the adaptation layer may not be applied between the UE and the eNB. For example, by associating the identifier of the Remote UE with the DRB ID, the adaptation layer may not be introduced between the UE and the eNB. The eNB 200 can notify the UE 100-1 of an association (for example, a list) between the identifier of the Remote UE and the DRB ID. Based on that list, the UE 100-1 and the eNB 200 can grasp which Remote UE packet the packet is for, from the DRB ID used for packet transmission.

The UE 100-2 may notify the UE 100-1 of an identifier for determination in the adaptation layer to distinguish between communication completed between the UE 100-1 and the UE 100-2 (communication requiring no relay) and communication between the UE 100-1 and the eNB 200 (communication requiring relay). That is, the UE 100-2 may include, into the header of the packet, the identifier for determination. The identifier for determination may be a 1-bit identifier. The identifier for determination may be an identifier for notifying the priority and also a special value. Based on that identifier, the UE 100-1 can distinguish between the communication completed between the UE 100-1 and the UE 100-2 (communication requiring no relay) and the communication between the UE 100-1 and the eNB 200 (communication requiring relay).

In the operation example 4, the example in which an LCID used between the UE 100-1 and the eNB 200 is assigned by the eNB 200 has been described. The eNB 200 may assign the LCID used between the UE 100-1 and the UE 100-2 to the UE 100-1 (and the UE 100-2). The eNB 200 may notify the UE 100-1 (and the UE 100-2) of the LCID for which a packet is permitted to be transmitted via the adaptation layer. The eNB 200 may notify the UE 100-1 (and the UE 100-2) of an LCID for which a packet is not permitted to be transmitted via the adaptation layer. The UE 100-1 may notify the UE 100-2 of the LCID.

When receiving a packet from the UE 100-2 by using the LCID for which the packet is permitted to be transmitted via the adaptation layer, the UE 100-1 can grasp that the packet is transmitted via the adaptation layer. Likewise, when receiving a packet from the UE 100-1 by using the LCID for which the packet is permitted to be transmitted via the adaptation layer, the UE 100-2 can grasp that the packet is transmitted via the adaptation layer.

When receiving a packet from the UE 100-2 by using the LCID for which the packet is not permitted to be transmitted via the adaptation layer, the UE 100-1 can grasp that the packet is not transmitted via the adaptation layer. Likewise, when receiving a packet from the UE 100-1 by using the LCID for which the packet is not permitted to be transmitted via the adaptation layer, the UE 100-2 can grasp that the packet is not transmitted via the adaptation layer.

The UE 100-1 and the UE 100-2 may grasp whether or not the packet is transmitted via the adaptation layer by the LCID included in the packet.

The UE 100-1 and UE 100-2 may use an LCID for which a packet is not permitted to be transmitted via the adaptation layer, for communication completed between terminals (communication of a packet not relayed).

In the operation example 6 described above, the method of grasping the priority of the packet to be transmitted by the DRB has been described. Likewise, the priority of the packet to be transmitted by an SRB (Signaling Radio Bearer) may be grasped. A packet to be transmitted by the SRB is, for example, control information transmitted (received) between the UE 100-1 and the eNB 200. A packet to be transmitted by the SRB may be control information to be transmitted (received) between the UE 100-1 and the MME 300. A packet to be transmitted in the SRB may need to be prioritized over packets to be transmitted by the DRB.

The eNB 200 may provide information for specifying a DRB ID to the UE 100-2 (UE 100-2) so that the packet to be transmitted by the SRB and the packet to be transmitted by the DRB can be distinguished from each other. For example, the eNB 200 may specify "DRB ID 4" as a packet to be transmitted by the SRB. The eNB 200 may specify another DRB (for example, DRB 5) for a packet to be transmitted by the DRB. The eNB 200 may provide a list in which the identification information and the priority are associated with each other to the UE 100-2. For example, a DRB ID to be transmitted by the SRB and high priority may be associated with each other.

The eNB 200 may specify that a packet to be transmitted by the SRB is transmitted by the SRB being used between the UE 100-1 and the eNB 200. The UE 100-1 may transmit a packet received from the UE 100-2 as if it is its own control signal (control packet).

The eNB 200 may set to the U 100-1 that a packet to be transmitted by the SRB is handled as a control signal transmitted by the UE 100-1. When receiving a packet to be transmitted by the SRB from the UE 100-2, the UE 100-1 may store the received packet as a parameter in its own control signal. The UE 100-1 may transmit the stored packet from the UE 100-2 as its own control signal by the SRB established with the eNB 200. The UE 100-1 may store, in the control signal, the received identifier of the UE 100-2 together with the packet from the UE 100-2.

As described above, the priority of a control packet and the priority of a user data packet may be distinguished from each other. Thus, it is possible to distinguish and grasp the priorities of the control signal (control packet) and the data (user data packet).

The adaptation layer described above may be a new layer that is not defined in the protocol of the existing LTE system. The adaptation layer may be an extended function of the layer (for example, PDCP) defined in the protocol of the LTE system. Therefore, the contents described as the operation in the adaptation layer may be, for example, of an operation in the (extended) PDCP layer.

The operations (operation examples) according to the above-described embodiment may be combined to be executed, where appropriate. In each of the above-described sequences, all of the operations may not necessarily be an essential configuration. For example, in each sequence, only some of the operations may be executed.

Although not particularly mentioned in the above-described embodiment, a program for causing a computer to execute each process performed by any one of the above-described nodes (such as the UE 100 and the eNB 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium is not particularly limited; the non-transitory recording medium may include a recording medium such as a CD-ROM or a DVD-ROM, for example.

Alternatively, a chip may be provided which includes: a memory for storing a program for performing each process performed by any one of the UE 100 and the eNB 200; and a processor for executing the program stored in the memory.

In the above-described embodiments, an LTE system is described as an example of the mobile communication system; however, the LTE system is not an exclusive example, and the content according to the present application may be applied to a system other than the LTE system.

Supplementary Note (Discussion)

In the Rel-13, L3 ProSe UE-to-NW Relay (L3 Relay) is specified. For the L3 Relay, Relay UE can identify which QoS is applied to the traffic received from Remote UE and which received traffic is addressed to which Remote UE based on the header in the IP packet. So there's no AS function used by the Relay UE that can be used to identify the associated QoS of the Remote UE's traffic and there is also no existing way for the Relay UE to identify which traffic from eNB is meant for specific Remote UE. However, there's no requirement for the eNB to identify the Remote UE for the L3 Relay operation.

Figure 25:
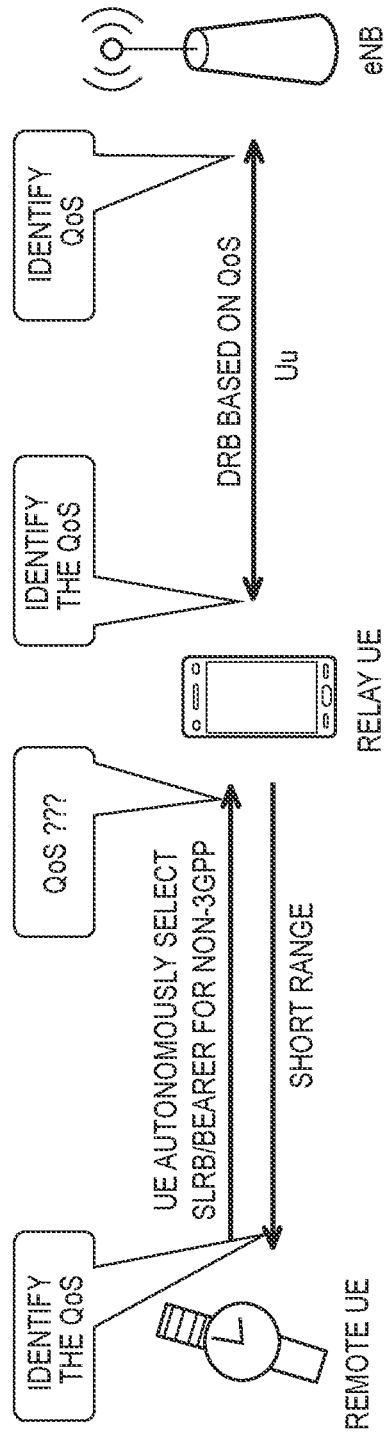
FIG. 25 is a diagram for describing a problem of QoS identification at a short-range interface.
Figure 26:
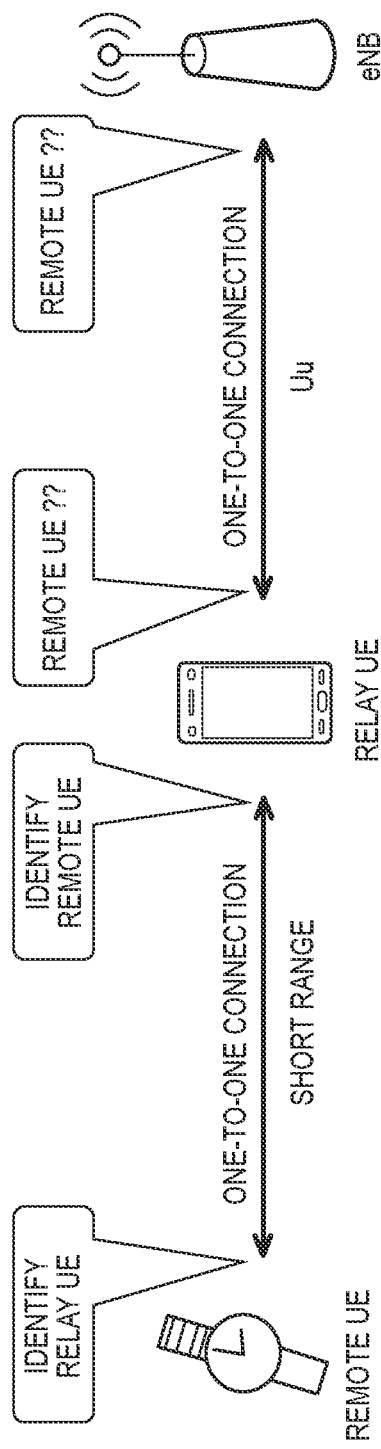
FIG. 26 is a diagram for describing a problem of Remote UE identification at a Uu interface.

So, for the L2 ProSe UE-to-NW Relay, we need to consider how the QoS of the traffic from Remote UE are identified on short range interface (see FIG. 25) and how the Remote UE mapped to the traffic on Uu interface are identified (see FIG. 26).

(1) Short Range Interface (1.1) QoS Identification

According to the email discussion, there are some solutions to identify the QoS from Remote UE's traffic, and majority of companies consider the introduction of adaptation layer to be beneficial when short range interface is non-3GPP access. However, regarding the 3GPP access, there's no consensus on whether the adaptation layer needs to be introduced, i.e. some companies propose that eNB configure the mapping between Sidelink Radio Bearer (SLRB) and Uu DRB and Relay UE identify the suitable Uu DRB for the Remote UE's traffic based on the LCID on Sidelink. Both the introduction of adaptation layer and introduction of mapping of an SL LCID to a Uu DRB can be workable; however, according to SID, one of the objectives is "Study the possibility of a common solution supporting the following use cases: (i) UE to network relaying over non-3GPP access. (ii). UE to network relaying over LTE sidelink. . . . (omitted)". So QoS identification on the short range interface should be achieved over RLC layer, e.g., by introduction of the adaptation layer e.g., by using an adaptation layer or enhancement of PDCP layer.

Proposal 1: In order to introduce the common solution to both 3GPP access and non-3GPP access, QoS identification on short range interface should be achieved over RLC layer, e.g. by using an Adaptation layer or enhancement of PDCP layer.

(1.2) Traffic Address Differentiation (Relay UE or eNB)

When non-3GPP access is used as the short range interface, Relay UE needs to know whether the Remote UE's traffic is for the Relay UE or the eNB, since Relay UE needs to know whether or not the new protocol for L2 Relay should be used. One of the ways to differentiate the address of UE's traffic is to introduce the rule that Remote UE always use new protocol for the transmission to Relay UE if Remote UE has established the L2 Relay connection with the eNB. Consequently, the Remote UE can indicate whether the traffic is addressed to the Relay UE or the eNB in the new protocol, e.g., indicating whether the traffic is for the eNB in the header of adaptation layer or in the enhanced PDCP header. Another way is to introduce a mechanism similar to the "LWA EtherType" to the L2 Relay via non-3GPP access. In LWA, when the data is forwarded to the UE over WLAN, WT uses "LWA EtherType" to inform the UE of an arrival of the data associated with the LWA operation. So it will be workable to introduce a similar mechanism for L2 Relay via non-3GPP access. The same issue also exists for 3GPP access. So the rule to always use the new protocol or the indication to identify the L2 Relay traffic will be necessary.

Proposal 2: RAN2 should discuss how to differentiate the address of the traffic on the short range interface.

(2) Uu Interface (2.1) Remote UE Identification

There are several solutions for Remote UE identification, e.g. introducing the new MAC CE, enhancing the RLC header, introducing the adaptation layer, and enhancing the PDCP header. On the point to identify the sender/receiver Remote UE, all the solutions will be workable. However, with regards to solution for MAC CE, in order to allow scheduling/LCP flexibility, it will be beneficial the solution for Remote UE identification on Uu should allow to multiplex different Remote UE's traffics to a MAC PDU.

Proposal 3: RAN2 should introduce the solution for Remote UE identification on Uu interfaces which allows multiplexing the different Remote UE's traffics to a MAC PDU.

(2.2) Multiple Uu DRB With Different QoS

Regarding the bearer modelling on Uu, "single Uu DRB model with multiple remote UEs mapped to a single DRB on Uu" has discussed. From the perspective of limiting the complexities to support large number of Remote UEs, a single Uu DRB model seems to be suitable. However, with respect to the QoS handling for the traffic from/to a Remote UE, it's beneficial to have the option for to configure multiple Uu DRBs for different QoSs. Since it may be assumed that Remote UE can be realized in different forms, e.g., smart watch, heart rate monitor, VR grasses or etc, the Remote UE in general, will be expected to utilize a variety of traffics.

Proposal 4: With respect to the QoS handling for the traffic from/to Remote UE, it's beneficial to have the option to configure multiple Uu DRBs for different QoSs.

The entire contents of U.S. Provisional Application No. 62/417544, filed on Nov. 4, 2016, are incorporated herein by reference.

The invention claimed is:

1. A communication method in which a first radio terminal executes a layer 2 relay in which a packet of a second radio terminal is transmitted between the second radio terminal and a base station in a layer higher than a Radio Link Control (RLC) layer in Layer 2, the communication method comprising:

transmitting, by the first radio terminal, information indicating that the first radio terminal is capable of executing the layer 2 relay, the information included in a discovery message for relay; and directly transmitting, by the second radio terminal, a request for the layer 2 relay to the first radio terminal in response to receiving the information, the request included in a message for requesting direct communication, wherein in the layer 2 relay, processing of the packet is executed in a special layer that is a higher layer than the RLC layer and different from a Packet Data Convergence Protocol (PDCP) layer, and the base station and the second radio terminal include, into the packet, information indicating that the packet has been processed in the special layer, in a layer lower than the special layer.

2. A communication method in which a first radio terminal executes a layer 2 relay in which a packet of a second radio terminal is transmitted between the second radio terminal and a base station in a layer higher than a Radio Link Control (RLC) layer in Layer 2, the communication method comprising:
- transmitting, by the first radio terminal, information indicating that the first radio terminal is capable of executing the layer 2 relay, the information included in a discovery message for relay; and
- directly transmitting, by the second radio terminal, a request for the layer 2 relay to the first radio terminal in response to receiving the information, the request included in a message for requesting direct communication, wherein
- in the layer 2 relay, processing of the packet is executed in a special layer that is a higher layer than the RLC layer and different from a Packet Data Convergence Protocol (PDCP) layer, and
- the base station notifies the first radio terminal of a logical channel identifier for which a packet is permitted to be transmitted via the special layer.

3. A first radio terminal configured to execute a layer 2 relay in which a packet of a second radio terminal is transmitted between the second radio terminal and a base station in a layer higher than a Radio Link Control (RLC) layer in Layer 2, the radio terminal comprising:
- a transmitter configured to transmit information indicating that the first radio terminal is capable of executing the layer 2 relay, the information included in a discovery message for relay; and
- a receiver configured to directly receive, from the second radio terminal, a request for the layer 2 relay, the request transmitted in response to receiving, by the radio terminal, the information, and the request included in a message for requesting direct communication, wherein
- in the layer 2 relay, processing of the packet is executed in a special layer that is a higher layer than the RLC layer and different from a Packet Data Convergence Protocol (PDCP) layer, and
- the receiver is configured to receive, from the base station, a logical channel identifier for which a packet is permitted to be transmitted via the special layer.

4. A second radio terminal comprising:
- a receiver configured to receive, from a first radio terminal configured to execute a layer 2 relay in which a packet of the second radio terminal is transmitted between the second radio terminal and a base station in a layer higher than a Radio Link Control (RLC) layer in Layer 2, information indicating that the first radio terminal is capable of executing the layer 2 relay, the information included in a discovery message for relay; and
- a transmitter configured to directly transmit a request for the layer 2 relay to the first radio terminal in response to receiving the information, the request included in a message for requesting direct communication, wherein
- in the layer 2 relay, processing of the packet is executed in a special layer that is a higher layer than the RLC layer and different from a Packet Data Convergence Protocol (PDCP) layer, and
- the second radio terminal further comprises a controller configured to include, into the packet, information indicating that the packet has been processed in the special layer, in a layer lower than the special layer.

* * * * *